(12) United States Patent
Gwozdz et al.

(10) Patent No.: US 11,907,299 B2
(45) Date of Patent: *Feb. 20, 2024

(54) SYSTEM AND METHOD FOR IMPLEMENTING A SECURITIES ANALYZER

(71) Applicant: KPMG LLP, New York, NY (US)

(72) Inventors: Joseph Gwozdz, Brooklyn, NY (US); Timothy J. Cerino, Hastings on Hudson, NY (US); Binoy Palakkal, Jersey City, NJ (US); Jesse David Koller, Plainview, NY (US)

(73) Assignee: KPMG LLP, New York, NY (US)

( * ) Notice: Subject to any disclaimer, the term of this patent is extended or adjusted under 35 U.S.C. 154(b) by 97 days.

This patent is subject to a terminal disclaimer.

(21) Appl. No.: 17/449,541

(22) Filed: Sep. 30, 2021

(65) Prior Publication Data
US 2022/0019624 A1    Jan. 20, 2022

Related U.S. Application Data

(63) Continuation-in-part of application No. 17/100,019, filed on Nov. 20, 2020, now Pat. No. 11,537,662, (Continued)

(51) Int. Cl.
*G06F 16/9032* (2019.01)
*G06F 40/14* (2020.01)
(Continued)

(52) U.S. Cl.
CPC ...... *G06F 16/90332* (2019.01); *G06F 16/116* (2019.01); *G06F 16/1794* (2019.01);
(Continued)

(58) Field of Classification Search
CPC .............. G06F 40/30; G06F 16/1794; G06F 16/90332; G06F 40/169; G06F 40/56
(Continued)

(56) References Cited

U.S. PATENT DOCUMENTS 7,139,752 B2    11/2006    Broder et al.
9,053,086 B2    6/2015    Dubbels
(Continued)

FOREIGN PATENT DOCUMENTS

WO    WO 2009/087431    7/2009

OTHER PUBLICATIONS

Apache UIMA, https://uima.apache.org/, pp. 1-5, Jul. 26, 2017.
(Continued)

*Primary Examiner* — Hung T Vy
(74) *Attorney, Agent, or Firm* — Hunton Andrews Kurth LLP

(57) ABSTRACT

The invention relates to computer-implemented systems and methods for analyzing and standardizing various types of input data such as structured data, semi-structured data, unstructured data, and images and voice. Embodiments of the systems and the methods further provide for generating responses to specific questions relating to certain rates and terms, such as LIBOR, as well as complex legal constructs, such as interest rate fallback waterfalls, for risk assessment and mitigation. The present invention performs environmental, social, governance analytics on asset-backed securities including commercial mortgage-backed securities.

20 Claims, 26 Drawing Sheets

Related U.S. Application Data which is a continuation of application No. 16/159,088, filed on Oct. 12, 2018, now Pat. No. 10,846,341.

(60) Provisional application No. 62/572,266, filed on Oct. 13, 2017.

(51) Int. Cl.

| | | |
|---|---|---|
| *G06F 40/30* | (2020.01) | |
| *G06F 40/56* | (2020.01) | |
| *G06F 40/131* | (2020.01) | |
| *G06F 40/169* | (2020.01) | |
| *G06F 40/205* | (2020.01) | |
| *G06F 40/216* | (2020.01) | |
| *G06F 40/295* | (2020.01) | |
| *G06N 20/00* | (2019.01) | |
| *G06F 16/178* | (2019.01) | |
| *G06F 16/11* | (2019.01) | |
| *G06F 16/28* | (2019.01) | |
| *G06F 16/35* | (2019.01) | |
| *G06V 30/413* | (2022.01) | |

(52) U.S. Cl.
CPC ............ *G06F 16/285* (2019.01); *G06F 16/35* (2019.01); *G06F 40/131* (2020.01); *G06F 40/14* (2020.01); *G06F 40/169* (2020.01); *G06F 40/205* (2020.01); *G06F 40/216* (2020.01); *G06F 40/295* (2020.01); *G06F 40/30* (2020.01); *G06F 40/56* (2020.01); *G06N 20/00* (2019.01); *G06V 30/413* (2022.01)

(58) Field of Classification Search
USPC .......................................... 707/769, 722, 736
See application file for complete search history.

(56) References Cited

U.S. PATENT DOCUMENTS

| | | | |
|---|---|---|---|
| 9,519,706 B2 | 12/2016 | Luke | |
| 9,984,428 B2 * | 5/2018 | Doyle | ................... G06F 40/205 |
| 10,373,268 B1 * | 8/2019 | Orphys | ................ G06Q 40/123 |
| 10,628,471 B2 * | 4/2020 | Chandramouli | ..... G06F 16/3344 |
| 10,760,480 B2 * | 9/2020 | Malm | ................... F02P 5/1502 |
| 2002/0143797 A1 | 10/2002 | Zhang et al. | |
| 2005/0289182 A1 | 12/2005 | Pandian et al. | |
| 2012/0011428 A1 | 1/2012 | Chisholm | |
| 2014/0067792 A1 | 3/2014 | Erdogan et al. | |
| 2014/0156833 A1 | 6/2014 | Robinson | |
| 2014/0297356 A1 | 10/2014 | Jayade | |
| 2015/0277900 A1 | 10/2015 | O'Keeffe et al. | |
| 2016/0179934 A1 * | 6/2016 | Stubley | ................. G06F 16/243 707/722 |
| 2016/0180437 A1 * | 6/2016 | Boston | ............... G06Q 30/0631 705/26.7 |
| 2017/0012988 A1 | 1/2017 | Turgeman et al. | |
| 2017/0069043 A1 | 3/2017 | Doyle et al. | |
| 2018/0025075 A1 * | 1/2018 | Beller | ................. G06F 16/3329 707/769 |
| 2018/0137419 A1 * | 5/2018 | Byron | ...................... G06N 5/02 |
| 2020/0111092 A1 * | 4/2020 | Wood | ..................... G06Q 40/04 |
| 2020/0133964 A1 * | 4/2020 | Lee | ........................ G06F 16/355 |
| 2021/0065304 A1 * | 3/2021 | Greene | ................. G06F 40/205 |

OTHER PUBLICATIONS

Apache UIMA Ruta™, https://web.archive.org/web/20170721192241/https:/uima.apache.org/ruta.html, pp. 1-3, (Wayback Machine dated Jul. 21, 2017; printed Nov. 4, 2019).

Industrial-Strength Natural Language Processing in Python, https://spacy.io/, pp. 1-4, Jul. 26, 2017.

Operationalize enterprise information into actionable intelligence, https://www.smartlogic.com, pp. 1-5, Jul. 26, 2017.

Watson Knowledge Studio documentation—Watson Developer Cloud, Creating a rule-based annotator, https://web.archive.org/web/20161219064856/http://www.ibm.com/watson/developercloud/doc/wks/wks_rule_annotator_ovw.shtml, pp. 1-15, (Wayback Machine dated Dec. 19, 2016; printed Nov. 4, 2019) (also includes 17-page addendum with text copied from Wayback Machine page).

International Search Report and Written Opinion issued in corresponding Application No. PCT/US18/55892, dated Dec. 26, 2018.

International Search Report and Written Opinion issued in corresponding Application No. PCT/US18/55921, dated Dec. 31, 2018.

International Searching Authority, International Application No. PCT/US22/45319, PCT Notification of the International Search Report and Written Opinion, dated Jan. 25, 2023, pp. 1-14.

* cited by examiner

FIG. 3

Lume name (string, required): A string representing the name of this lume
lume_id (uuid, optional): An unique identifier of UUID type. If not provided it will be set to a Type 4 UUID
data (obj, optional): An arbitrary data object - expected to be JSON-serializable.
elements (iterable, optional): An iterable of Lume Element objects

Lume Element
element_type (string, required): A string representing the type of this lume element
element_id (uuid, optional): An unique identifier of UUID type. If not provided it will be set to a Type 4 UUID
attributes (iterable, optional): A key-value data structure of arbitrary primitive types

Lume Element

Lume Element

Lume Element

Lume Element

Protocol Number: ZZ4023452
Date: 19-Sep-2013
Revised Date: 30-Apr-2015

Observational Study Protocol ZZ4023452
Renal Cell Cancer Molecular Profiling and Clinical Outcomes in U.S. Community Oncology Practices

Reviser Protocol Number: 01
Incorporates Amendment 07

Study Director
Tammy Stevens, PhD, MPH
Telephone (Office): 634-837-1026 — Lume Element 411

Protocol Manager
Mike Dolan
Telephone (Office): 634-227-5552 — Lume Element 412

CRO
Martha Jean
2012 Tenth st, 50th Floor, North Attleboro, MA 02139 Telephone (Office): 333-567-2351 — Lume Element 413

Xenon, Young and Zenith R&D
234 Old West Highway
Youngstown, OH 23402 — Lume Element 414

This document is the confidential and proprietary information of Xenon, Young and Zenith Company and its global affiliates (XYZ). By reviewing this document, you agree to keep it confidential and to use and *disclose it solely for the purpose* of assessing whether your organization will participate in and/or the performance of the proposed XYZ-sponsored study. Any permitted disclosures will be made only on a confidential "need to know" basis within your organization or to your independent ethics committee(s). Any other use, copying, disclosure or dissemination of this information is strictly prohibited unless expressly authorized in writing by XYZ. Any supplemental information (e.g. amendments) that may be added to this document is also confidential and proprietary to XYZ and must be kept in confidence in the same manner as the contents of this document. Any person who receives this document without due authorization from XYZ is requested to return it to XYZ or promptly destroy it. All other rights reserved.

Lume Element 415
Approved v4.0  930074357  4.0

FIG. 9

| Name | Condition | Expression | Scope |
|---|---|---|---|
| Termination_Term_Date | | %ANNOTATE[<termination_date>] %FILTER[<DATE>] ((%TERMINATION_LANGUAGE %AND %CONTRACT_DATE_LANGUAGE) %IN <SENTENCE>) | %TERMINATION_CLAUSE |
| | Finds sentences that have both the termination language, and the contract date. In those sentences, the dates are extracted, and those dates are written back into the Lume as Lume Elements of type termination_date. | | |
| Notification_Language | | "notify" %OR "notice" %OR "notified" %OR "inform" %OR "informing" %OR "informed" | |
| | This expression is used to capture language related to notification and the result is returned into the value of the variable $Notification_Language | | |
| Key_Personnel | | "key person" "investment team" "professional staff" "senior staff" "senior officers" "portfolio manager" "portfolio managers" "investment managers" "key decision makers" "key employees" | |
| | This expression is used to capture language related to key personnel and the result is returned into the value of the variable $Key_Personnel | | |
| Key_Personnel_ Notification_Sentence | | <SENTENCE> %CONTAINING ($Key_Personnel %AND $Notification_Language) | %NOTIFICATION_CLAUSE |
| | This expression searches for notification clauses section in the document that contain both the key personnel, and the notification language. The sentence that contains this clause is returned into the variable $Key_Personnel_Notification_Sentence | | |
| Key_Personnel_ Notification_ Determination | | %ANNOTATE[<key_person_notification>] %ML_KEYPERSON_MODEL ($Key_Personnel_Notification_Sentence) | |
| | This model will run a Machine Learning classifier on the sentences identified in the $Key_Personnel_Notification_Sentence. The resulting determination and score are stored as annotations as Lume Elements of type key_person_notification. | | |
| Key_Person_Identified | $Key_Personnel_Noti fication_Determination | %WRITE[<key_person_identified value=True>] | |
| | If the $Key_Personnel_Notification_Determination is true, then the Lume Element with type key_person_identified, and attributes "value", True will be written into the Lume | | |

Syntax: %[OPERATOR] $[VARIABLE] <LUME ELEMENT> "STRING"

FIG. 10

| Filename | Termination_Term_Date | Key_Person_Notification_Determination (value) | Key_Person_Notification_Determination (Confidence Score) | Key_Person_Identified |
|---|---|---|---|---|
| Contract1_AcmeCo.pdf | 12/31/2020 | 30 days | .95 | True |
| Contract2_AcmeCo.pdf | 3/31/2018 | 60 days | .81 | True |
| Contract1_AcmeIntl.pdf | 9/30/2022 | 90 days | .40 | False |
| Contract1_CA.pdf | 7/31/2021 | 60 days | .92 | True |
| Contract1_Util.pdf | 4/15/2019 | 2 weeks | .88 | True |
| Contract1_Anytown.pdf | 4/1/2020 | 30 days | .92 | True |

obligations under this agreement or applicable law, which belief is based upon and supported by tangible evidence of such failure to comply or perform.

14. Assignment. In accordance with Sections 205 (a) (2) and 205 (a) (3) of the Investment Advisers Act of 1940, you may not assign this agreement without our prior written consent. Any unpermitted assignment shall effect an immediate termination of this agreement. You shall promptly notify us in writing of any significant change in your management, including any significant change in your professional staff directly responsible for your activities under this agreement or any material change in the ownership or organization of your firm. Notwithstanding the above, Client will be notified by the Manager of a change in general partners of the Manager within a reasonable time thereafter. We may assign this agreement to any trust that holds assets of any Plan without your consent upon written notice. A change in the identity of the Investment Office shall not constitute an assignment of this agreement.

15. Notices. Any written notice required by or pertaining to this agreement shall be personally delivered, or sent by prepaid first class mail or by fax as follows:

1610 Asset Details [Remove]

| | | | |
|---|---|---|---|
| ISIN | US111122AAA | CUSIP | 11112222 |
| LIBOR Data Category | Process - Perm | Dated Date | |
| Domicile | | Issuer Name | B MYERS... |
| Rate Type | Fixed Rate | Issue Description | SR NT 144A |
| Underwriter | MS.... | Security Type Description | Note |

1612 Supporting Documents (1)

| File Name | Date | File Size |
|---|---|---|
| 11112222.pdf | 05/16/2019 | 940.0 KB |

1 to 1 of 1  |< < Page 1 of 1 > >|

Questions  1614

Question 1
Is a LIBOR rate(s) referenced in the asset's Associated documentation        Yes Question 2
Does the documentation contain permanent successor rate language?        Yes Question 3
Does the language contain an explicit replacement rate?

Question 4
If not, what is the process for Establishing a replacement rate?        3rd Party Interpretation Question 5
Does the documentation contain temporary IBOR cessation language?        Yes Question 6
If so, what is the fallback sequence?        Bank Survey / Last-Known LIBOR Question 7
What was the last condition in the sequence?        Last-Known LIBOR Question 8
Is there an interest floor?        No Question 9
What is the governing law?        State of New York Question 10
Is there a consent solicitation clause?        No

1716

Otherwise, the Company will select three major banks in New York City and shall request each of them to provide to the Calculation Agent a quotation of the rate offered by them at approximately 11:00 a.m., New York City time, on the interest determination date for loans in U.S. dollars to leading European banks having an index maturity of three months for the applicable interest period in an amount of at least $1 million that is representative of single transactions at that time Notwithstanding the paragraph immediately above, if the Company, in its sole discretion, determines that LIBOR has been permanently discontinued and the Company has notified the Calculation Agent of such determination (a "LIBOR Event"), the Calculation Agent will use, as directed by the Company, as a substitute for LIBOR (the "Alternative Rate") for each future floating rate interest determination date, the alternative reference rate selected by the central bank, reserve bank, monetary authority or any similar institution (including any committee or working group thereof) that is consistent with market practice regarding a substitute for LIBOR. As part of such substitution, the Calculation Agent will, as directed by the Company, make such adjustments to the Alternative Rate or the spread thereon, as well as the business day convention, interest determination dates and related provisions and definitions ("Adjustments"), in each case that are consistent with market practice for the use of such Alternative Rate.

< Page 56 of 198 >

1710

| Document Details | | | |
|---|---|---|---|
| Document Name 11112222.pdf (962.6 KB) | Document Date | May 16, 2019 | |
| CUSIP 11122AA2 | ISIN | US1112221 | |
| Issue Description SR NT 144A | Issuer Name | B MYERS... | |
| Security Type Note | | | |
| Description | | | |
| ⚠ Exceptions (0) | | | |

| Question | Answer | |
|---|---|---|
| Question 1 Is a LIBOR rate(s) referenced in the asset's Associated documentation? | Yes | |
| Question 2 Does the documentation contain permanent successor rate language? | Yes | 1714 |
| Question 3 Does the language contain an explicit replacement rate? | Yes | |
| Question 4 If not, what is the process for Establishing a replacement rate? | 3rd Party Interpretation | |
| Question 5 Does the documentation contain temporary IBOR cessation language? | Yes | |
| Question 6 If so, what is the fallback sequence? | Bank Survey   Last-Known LIBOR | |
| Question 7 What was the last condition in the sequence? | Last-Known LIBOR | |
| Question 8 Is there an interest floor? | No | |
| Question 9 What is the governing law? | State of New York | |

SYSTEM AND METHOD FOR IMPLEMENTING A SECURITIES ANALYZER

CROSS-REFERENCE TO RELATED APPLICATION

This application is a continuation-in-part of and claims the benefit of the filing date of U.S. patent application Ser. No. 17/100,019, filed on Nov. 20, 2020, which is a continuation of U.S. patent application Ser. No. 16/159,088, filed on Oct. 12, 2018 and now U.S. Pat. No. 10,846,341, which claims the benefit of the filing date of, and incorporates by reference thereto in its entirety, U.S. Provisional Patent Application Ser. No. 62/572,266, filed on Oct. 13, 2017.

FIELD OF THE INVENTION

The present invention relates to systems and methods for analyzing and standardizing various types of input data, and generating responses to specific questions based on the standardized input data. More specifically, the present invention relates to a securities analyzer that generates responses specific to certain rates and terms, such as LIBOR, as well as complex legal constructs, such as interest rate fallback waterfalls, amendments and waivers, and interest rate floors for risk assessment and mitigation. The present invention performs environmental, social, governance analytics on asset-backed securities including commercial mortgage-backed securities, auto asset-backed securities, collateralized loan obligations, and residential mortgage-backed securities.

BACKGROUND

The digitization of labor continues to progress as advancements in machine learning, natural language processing, data analytics, mobile computing and cloud computing are used in various combinations to replace certain processes and functions. Basic process automation can be implemented without significant IT investment as solutions may be designed, tested and implemented for a relatively low cost. Enhanced process automation incorporates more advanced technologies that enable the use of data to support elements of machine learning. Machine learning tools can be used to discover naturally-occurring patterns in data and to predict outcomes. And natural language processing tools are used to analyze text in context and extract desired information.

However, such digital tools are generally found in a variety of formats and coding languages and, therefore, are difficult to integrate and are also not often customized. As a result, such systems would not be able to provide automated solutions or answers to specific questions requiring analysis and processing of various types of input data e.g., structured data, semi-structured data, unstructured data, and images and voice. For example, such systems are currently unable to efficiently address questions such as "which of these 500 contracts fails to comply with new banking regulation XYZ?"

In 2023, London Interbank Offered Rate (LIBOR) will be phased out, affecting the broad universe of floating rate fixed income securities and securitizations.

At present, there are over $15 trillion outstanding LIBOR-indexed securities with at least $10 trillion to be outstanding when LIBOR ceases to be quoted, after December 2021. The financial risk characteristics of these assets may change significantly after LIBOR ceases. Asset managers, pension managers, sovereign wealth funds and other stakeholders with such fiduciary responsibilities will need streamlined ways to analyze LIBOR-related risk profiles with greater granularity and at scale.

The types of affected instruments include: LIBOR-indexed Floating Rate Notes (FRNs); Securitization of LIBOR Adjustable Rate Mortgages (LIBOR ARMs ABS); Residential Mortgage-Backed Securities with Floating Rate Tranches: REMICs, CMOs, PAC Floaters, TAC Floaters, Inverse Floaters, Super Floaters, etc.; Structured Notes; Credit Linked Notes; Collateralized Debt Obligations; Collateralized Mortgage Obligations; Asset Backed Securities with Floating Tranches; and Indexed Amortizing Notes.

Securities may contain "fall-back language" that explains what to do if LIBOR is unavailable. However, fall-back mechanisms can significantly change the risk profile of securities. For example, a floater may become a fixed rate instrument, dramatically altering rate sensitivity (duration) and price volatility. In addition, this may result in uncertain rate risk outcomes.

It would be desirable, therefore, to have a system and method that could overcome the foregoing disadvantages of known systems and that could apply automated and customized analysis to analyze documents, communications, text files, websites, and other structured and unstructured input files to generate output in the form of answers to specific questions and other supporting information.

SUMMARY

According to one embodiment, the invention relates to a computer-implemented method that implements a securities analyzer tool that analyzes structured and unstructured securities data. The method comprises: identifying one or more data sources of securities documentation; identifying a set of questions relating to environmental social governance (ESG) compliance; identifying a security instrument and a corresponding set of documents to be analyzed; and applying an artificial intelligence process to the corresponding set of documents, the artificial intelligence process comprising the steps of: generating, for the at least one input file, a converted file in a data format that is standardized for a plurality of input file types and that includes at least one element; wherein the at least one element is associated with an element identifier and an element type, and is stored in a non-hierarchical relationship format; generating at least one expression, wherein the expression comprises an expression string in a domain-specific language; reading, via a machine review portion of the artificial intelligence process, the at least one expression; applying, via the machine review portion of the artificial intelligence process, the at least one expression to the converted file to automatically generate a response to each of the set of questions; and generating, via an interactive user interface, data relating to the security instrument and the response to each of the set of questions.

According to another embodiment, the invention relates to a computer-implemented system that implements a securities analyzer tool that analyzes structured and unstructured securities data. The system comprises: an interface to one or more data sources configured to store and manage securities documentation; and a server configured to: identify a set of questions relating to environmental social governance (ESG) compliance; identify a security instrument and a corresponding set of documents to be analyzed; apply an artificial intelligence process to the corresponding set of documents, the artificial intelligence process comprising the steps of: generating, for the at least one input file, a converted file in a data format that is standardized for a plurality of input file types and that includes at least one element; wherein the at least one element is associated with an element identifier and an element type, and is stored in a non-hierarchical relationship format; generating at least one expression, wherein the expression comprises an expression string in a domain-specific language; reading, via a machine review portion of the artificial intelligence process, the at least one expression; applying, via the machine review portion of the artificial intelligence process, the at least one expression to the converted file to automatically generate a response to each of the set of questions; and generating, via an interactive user interface, data relating to the security instrument and the response to each of the set of questions.

The invention also relates to computer-implemented system for analysis of structured and unstructured data to provide answers to specific questions, and to a computer-readable medium containing program instructions for executing a method for analysis of structured and unstructured data.

The system may provide value in a number of ways including: (a) providing 100% coverage vs. traditional sampling approaches; (b) reducing costs and development time needed to produce insights; (c) enabling humans to achieve and manage precise consistency; (d) leveraging the knowledge and experience of subject matter experts; and (e) automatically creating audit logs describing how data has been processed.

Additional business benefits include: pre-trained AI for a set of standard LIBOR questions; LIBOR language analysis reporting by: question; issuer; and product type; downloadable reporting by: issue, document; embedded roll-up logic for amendments and multi-document packages; rapid assessment; global document and knowledge repository; interactive user interface with portfolio summary; security detail; document detail; and a document viewer to inspect underlying prospectus and governing documents. Additional services may include: portfolio summary view; security-level reporting and document-level reporting.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 3 is a representation of a standard data format for a converted file, referred to herein as Lume, according to an exemplary embodiment of the invention.

FIG. 4B illustrates a larger view of the document with metadata depicted in FIG. 4A.

FIG. 9 is an example of expression, presented as expression strings shown in a table according to an exemplary embodiment of the invention.

FIG. 10 is an example of output from an intelligent domain engine in the form of predicted answers according to an exemplary embodiment of the invention.

FIG. 11 is an example of output from an intelligent domain engine in the form of support and justification for answers according to an exemplary embodiment of the invention.

FIG. 16 is an exemplary asset view, according to an embodiment of the present invention.

FIG. 17 is an exemplary document view, according to an embodiment of the present invention.

FIG. 18 is an exemplary document view, according to an embodiment of the present invention.

DETAILED DESCRIPTION

Figure 1:
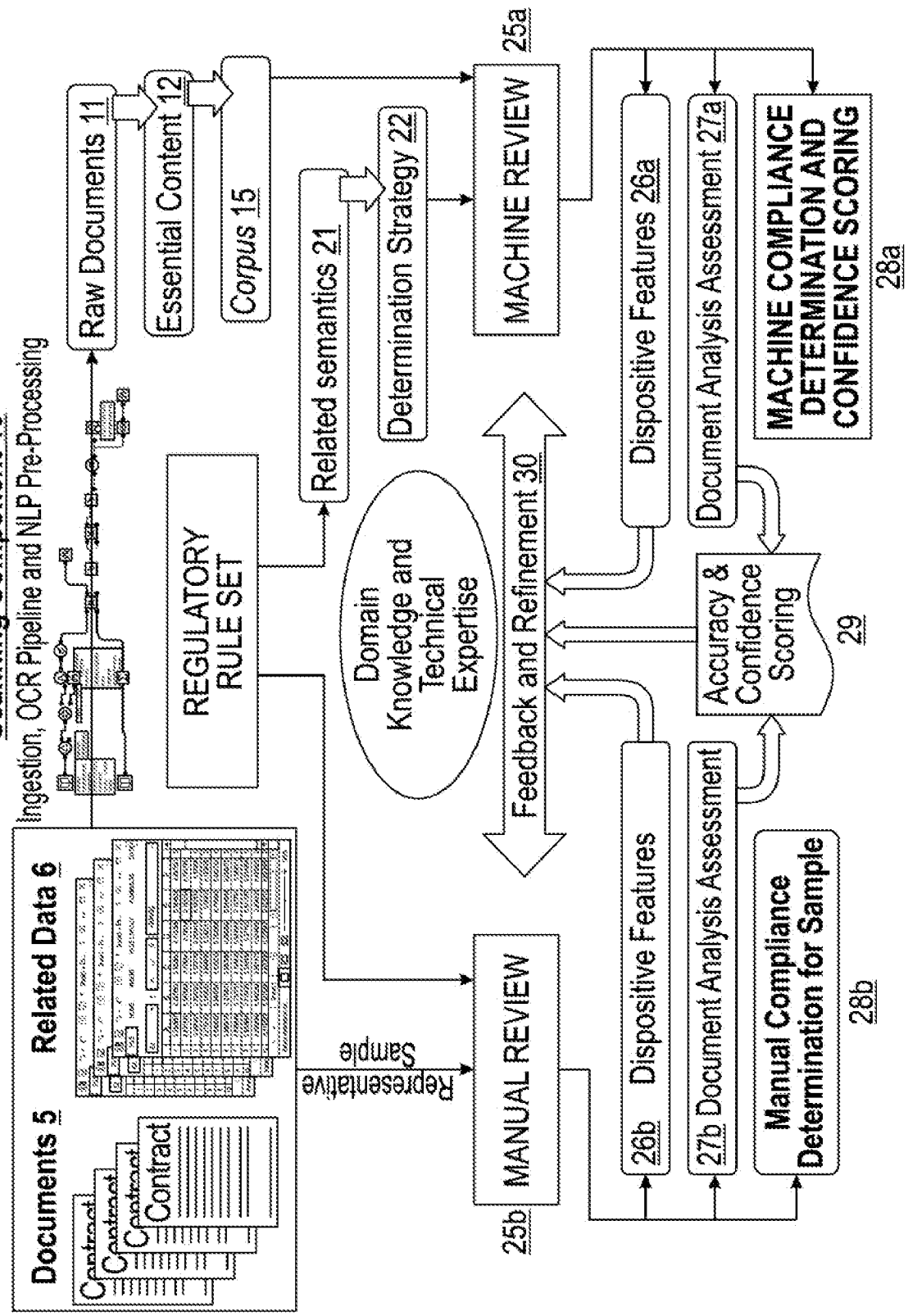
FIG. 1 is a functional block diagram for an analysis system according to an exemplary embodiment of the invention.

Exemplary embodiments of the invention will now be described in order to illustrate various features of the invention. The embodiments described herein are not intended to be limiting as to the scope of the invention, but rather are intended to provide examples of the components, use, and operation of the invention.

According to one embodiment, the invention relates to an automated system and method for analysis of structured and unstructured data. The analysis system (sometimes referred to herein as the "System") may include a portfolio of artificial intelligence capabilities, including artificial intelligence domain expertise and related technology components. The System may include foundational capabilities such as document ingestion and optical character recognition (OCR), e.g., the ability to take documents and convert them into formats readable by a machine to perform analytics.

According to a preferred embodiment, the System also includes machine learning components that provide the ability for the System to learn without being explicitly programmed (supervised and unsupervised); deep learning components that model high-level abstractions in data; and natural language processing (NLP) and generation, e.g., functionality to understand human speech or text and produce text or speech.

The System can also be designed to ingest and process various types of input data, including structured data (e.g., data organized in columns and rows such as transactional system data and Microsoft Excel files); semi-structured data (e.g., text not stored in a recognized data structure but that still contains some type of tabs or formatting, such as forms); unstructured data (e.g., text not stored in a recognized data structure, such as contracts, Tweets and policy documents); and images and voice (e.g., photographs or other visual depictions of physical objects and human voice data).

The System can be deployed to ingest, understand and analyze the documents, communications, and websites that make up the rapidly growing body of structured data and unstructured data. According to one embodiment, the System may be designed to: (a) read transcripts, tax filings, communications, financial reports, and similar documents and input files, (b) extract information and capture the information into structured files, (c) assess the information in the context of policies, rules, regulations, and/or business objectives, and (d) answer questions, produce insights, and identify patterns and anomalies in the information. The System can capture and store subject matter expertise; ingest, mine and classify documents using natural language processing (NLP); incorporate advanced machine learning and artificial intelligence methods; and utilize collaborative, iterative refinement with advisory and client stakeholders.

Examples of questions that the System can answer may include, for example, which documents comply with a certain policy or regulation, which assets are most risky, which claims warrant intervention, which customers are most/least likely to undergo attrition, which clients will have growing/shrinking wallet and market share, and which documents are experiencing a change in trend or meaning. Examples of policies or rules that the System can analyze may include, for example, new regulations, accounting standards, profitability targets, identification of accretive vs. dilutive projects, assessment of credit risk, asset selection, rebalancing a portfolio, or settlement outcomes, to name a few. Examples of documents that the System can analyze may include, for example, legal contracts, loan documents, securities prospectus, company financial filings, derivatives confirms and masters, insurance policies, insurance claims notes, customer service transcripts, and email exchanges.

FIG. 1 is a functional block diagram of a system for automated analysis of structured and unstructured data according to an exemplary embodiment of the invention. As shown in FIG. 1, the System integrates a variety of data sources, domain knowledge, and human interaction, in addition to the algorithms that ingest and structure the content. The System includes a scanning component 10 to ingest a plurality of documents 5 such as contracts, loan documents, and/or text files, and to extract related data 6. During the ingestion process, the System may incorporate OCR technology to convert an image (e.g., PDF image) into searchable characters and may incorporate NLP pre-processing to convert the scanned images into raw documents 11 and essential content 12. In addition, the appropriate ingestion approach will be used to convert and preserve document metadata and formatting information. In many instances, the input unstructured data will reside in a multitude of documents which together form a corpus 15 of documents that is stored in a dataset.

The FIG. 1 example depicts a "Regulatory Rule Set" that has been implemented in a particular business context. One example of a regulatory rule set may be new or amended financial regulations, and a financial institution or company may need to ensure that its contracts comply with the new regulations. Manual review of the contracts to assess compliance with new regulations is one alternative, but that approach could well involve a very substantial time commitment and extensive costs for experts to review the contracts. Alternatively, the System can be configured to read the contracts, extract information and capture the information into structured files, assess the information in the context of the amended regulations and/or business objectives, and answer questions, produce insights, and identify patterns and anomalies in the contracts. Exemplary embodiments of the invention can thus automate the analysis of complex documents which can provide the benefits of enabling 100% coverage rather than traditional sampling approaches, reducing costs and development time needed to produce insights, enabling humans to achieve and manage precise consistency, leveraging the knowledge and expertise of subject matter experts (SMEs), and automatically creating audit logs describing how the data has been processed.

Referring to FIG. 1, the regulatory rule set is used by subject matter experts in the manual review and are also translated into related semantics 21 and a determination strategy 22 in the machine review. Semantics 21 include domain knowledge embodied in an ontology or knowledge base consisting of entities, relationships and facts. The determination strategy 22 consists of business rules applied to the related semantics 21 to answer specific questions. This includes document-level assessments (such as compliant vs non-compliant), feature-level extraction (termination dates, key entities), inferred facts (such as utilizing extracted facts and the ontology to make inferences), or to identify risk (such as identify portions of the document that require further scrutiny). The machine learning review 25a analyzes dispositive features 26a, such as the specified contract terms, dates, entities, and facts, and undertakes an automated document analysis assessment 27a through the use of an intelligent domain engine (sometimes referred to herein as the "IDE"). The machine learning review 25a assists the machine compliance determination 28a by providing confidence scoring. In parallel, the manual review 25b of selected documents, conducted for example by a subject matter expert, analyzes dispositive features 26b and undertakes a document analysis assessment 27b and a manual compliance determination 28b for a sample of the contracts. The parallel manual and machine assessments are used to determine accuracy and confidence scoring 29, which is then used as feedback 30 for the manual review and the machine review. The feedback 30 allows for the refinement of the machine review, such that each iteration can provide enhanced accuracy in the automated analysis and a corresponding increase in confidence scoring. Active learning methods are used to decrease the number of iterations needed to achieve a given accuracy.

Figure 2:
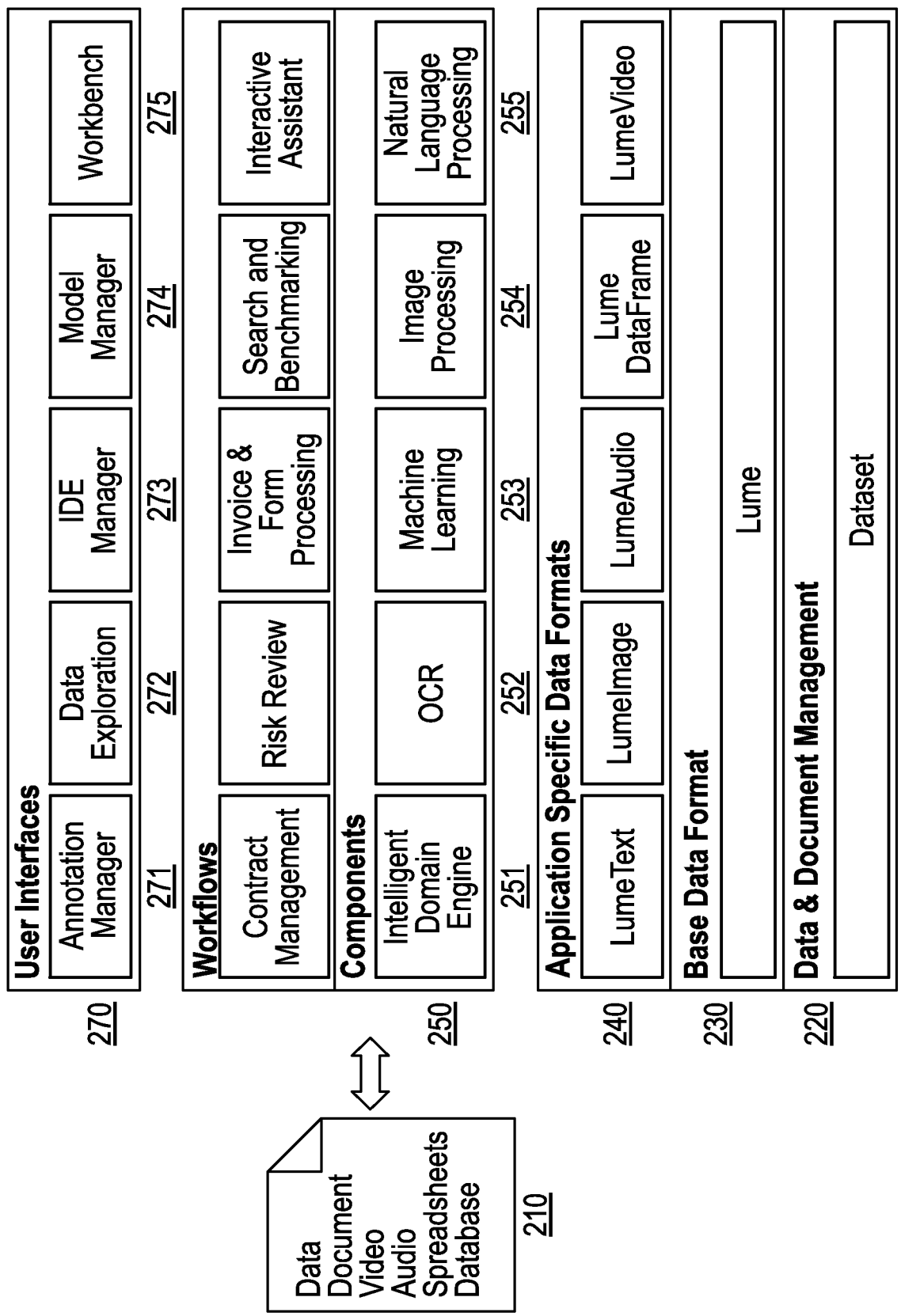
FIG. 2 is a diagram of the architecture of an analysis system according to an exemplary embodiment of the invention.

Referring to FIG. 2, the architecture of the System is depicted according to an exemplary embodiment of the invention. As mentioned previously, the System can support information extraction and data analysis on structured and unstructured data. The input data 210 may take the form of various files or information of different types and formats such as documents, text, video, audio, tables, and databases. As shown in FIG. 2, the data to be analyzed can be input to a core document management system 220.

According to a preferred embodiment of the invention, the input data 210 is transformed into a common data format 230, referred to in FIG. 2 as "Lume." Lume may preferably be the common format for all components and data storage. As shown in FIG. 2, the core document management system includes a document conversion system 240 (to convert documents to a Lume format 230) and a document and corpus repository 220. The document conversion system provides a utility for extracting document data and metadata and storing it in a format 240 used to perform natural language processing. The standardized Lume format 230 facilitates the processing and analysis of data in the Lumes because a multitude of components can then be easily applied to the Lumes and utilize upstream information for enhanced processing. In one application, a workflow of processing can be chained together to identify sentences, tokens, and other document structure; entity identification; annotation against a taxonomy or ontology; and the intelligent domain engine 251 can utilize this information to create derived and inferred features. Each of these components utilizes a Lume 240 as input, and Lume 240 as output, and the metadata can be inserted additively into the Lume. Other examples of components may include, for example, different engines, natural language processing (NLP) components 255, indexing components, and other types of components (e.g., optical character recognition (OCR) 252, machine learning 253, and image processing 254).

Components 250 read Lumes 240 and generate Lume Elements. The Lume Elements are then stored in stand-off annotation format (which is depicted by the database 220, the parent class definition in the base data format 230, and the specific instances of the formats in the application specific data formats 240). As an example, the NLP component 255 processes a Lume 240 and adds additional Lume Elements to indicate human language specific constructs in the underlying data, including word tokens, part-of-speech, semantic role labels, named entities, co-referent phrases, etc. These elements can be indexed to provide users with the ability to quickly search for a set (or individual) Lume 240 or Lume Elements through a query language.

The Lume technology will be described further below with reference to FIGS. 3-6.

FIG. 2 also illustrates that a number of machine learning (ML) components 253 can be incorporated into the System. For example, the System may include an ML conversion component, a classification component, a clustering component, and a deep learning component. The ML conversion component converts the underlying Lume representations into machine-readable vectors for fast analytic processing. The classification component maps a given set of input into a learned set of outputs (categorical or numeric) based on initial training and configuration. The clustering component produces groups of vectors based on a pre-determined similarity metric. The deep learning component is a specific type of machine learning component 253 that utilizes a many-layer network representation of nodes and connections to learn outputs (categorical or numeric).

FIG. 2 illustrates that the System may include a number of user interfaces 270 that enable different types of users to interact with the System. The IDE manager 273 allows users to modify, delete and add expressions to the System. The model manager 274 allows users to select machine learned models for execution in a pipeline. A search interface 272 (i.e., data exploration) allows users to find data loaded in the platform. The document & corpus annotator 271 (i.e., annotation manager) and editors allows users to manually create and modify annotations on a Lume and group Lumes into corpora for training and testing the System. Visual workflow interfaces 275 (i.e., workbench) provide a visual capability for building workflows, and can be used to create histograms and other statistical views of the data stored in the platform.

FIG. 3 illustrates properties and features of a Lume according to an exemplary embodiment of the invention. As shown in FIG. 3, the "name" is a string comprising a non-qualified name of the document. The "data" is a string or binary representation of the document (e.g., serialized data representing the original data). The "elements" are an array of Lume Elements.

As shown in FIG. 3, each Lume Element includes an element ID and an element type. According to a preferred embodiment of the invention, only an element ID and element type are required to define and create a Lume Element. The element ID is a string comprising a unique identifier for the element. The element type is a string that identifies the type of Lume Element. Examples of types of Lume Elements include a part-of-speech (POS) such as noun, verb, adjective; and a named-entity-recognition (NER) such as a person, place or organization. Additionally, file path and file type information can be stored as elements. The file path is a string comprising the full source file path of the document. The file type is a string comprising the file type of the original document.

Although not required, a Lume Element may also include one or more attributes. An attribute is an object comprised of key-value pairs. An example of a key-value pairs might be, for example, {"name":"Wilbur", "age":27}. This creates a simple, yet powerful format that allows the developer flexibility. The reason only the element ID and type are required, according to an exemplary embodiment of the invention, is that it provides flexibility to the developers to store information about a Lume in an element while also ensuring that it's accessible by ID or type. This flexibility allows users to determine how they would like to store relationships and hierarchies among elements according to their domain expertise. For example, elements can contain the necessary information for complicated linguistic structures, store relationships between elements, or refer to other elements.

According to an exemplary embodiment of the invention, the Lume Elements are used to store stand-off annotation format. That is, the elements are stored as annotations separately from the document text, rather than being embedded in the text. According to this embodiment, the System does not modify and can restore the original data.

According to a preferred embodiment, the Lume Elements are not stored in a hierarchical relationship to other Lume Elements, and document data and metadata are stored in a non-hierarchical fashion. Most known formats (other than Lume) are hierarchical, making them difficult to manipulate and convert. Lume's non-hierarchical format allows for easy access to any elements of the document data or its metadata, either at the document level or the text level. In addition, editing, adding, or parsing the data structure can be done via the operations on the elements without the need to resolve conflicts, manage the hierarchy or other operations that may or may not be required for the application. According to this embodiment, because it is a stand-off annotation format, the System can preserve an exact copy of the original data and support overlapping annotations. In addition, this allows for the annotation of multiple formats, such as audio, image and video.

The Lume technology can provide a universal format for document data and metadata. Once the Lume has been created, it can be used in each tool of a natural language processing pipeline without the need for writing format conversions to incorporate tools into the pipeline. This is because the basic conventions required to pass the data and metadata are established by the Lume format. The System provides utilities for extracting document data and metadata from a number of formats, including plain text and Microsoft Word. Format-specific parsers convert the data and metadata from these formats into Lume, and correspondingly write the modified Lume back to the format. The System can use the Lume technology to store information related to families of words to prepare them for natural language processing, such as preprocessing and stemming. In addition, the System can use the Lume technology to store information related to relationships, and graph structures in the document.

According to an exemplary embodiment of the invention, the System includes other components in addition to the Lume and Lume Elements. In particular, the System may be configured to include a dataset, a Lume Data Frame, an Ignite component, and an element index. A dataset is a collection of Lume objects that have a unique identifier. A dataset is typically used to designate training and testing sets for machine learning and can also be used for performing bulk operations on many documents. A Lume Data Frame is a specialized matrix representation of a Lume. Many machine learning and numerical operation components within the System can leverage this optimized format. The System may also include Ignite components that read Lume (or Lume Corpus) data and return Lume (or Lume Corpus) data, usually by processing existing Lume Elements or the original source data and adding new Lume Element objects. An element index is computer object representation of sets or elements and representations typically leveraged in Ignite for efficiency in Lume data and metadata retrieval. For example, some components may be optimized to work over character offsets and therefore an index on character offsets can speed up operations on those components.

According to an exemplary embodiment of the invention, the primary functionalities of the System include data representation, data modeling, discovery and composition, and service interoperability, described as follows.

Data Representation: Lume is the common data format used for storing and communicating analyses on the System. Lume takes a stand-off approach to data representation, e.g., results of analytics are stored as annotations independently of original data. According to one embodiment, Lume is implemented in Python and has computer-object representations as Python objects and is serialized as JavaScript Object Notation ("JSON") for inter-process communication. Lume may be designed for use with web-based specifications, such as JSON, Swagger (YAML), RESTful and will interface with the Python ecosystem, but it can also be implemented in, and support components written in Java and other languages.

Data Modeling: Lume can be designed to be simple and only enforce basic requirements on users of the System. Interpretations and business logic are left to the users of the System rather than requiring declarative representations of both data and processes. The System can be designed to leave the modeling informal and to leave the details for implementations in the processing components. This allows Lume to maintain a very simple specification, and allows it to be extended for specific applications without impeding other applications. For example, when searching the Lume is important, it is integrated with modules that index on top of the Lume structure. When working with a document object model (DOM) is important, the DOM parser stores the addition information in the form of Lume Elements and attributes into the Lume, and converts back out to a DOM model with this information.

Discovery and Composition: Lume may also have an additional design feature relating to analytic process provenance. The System workflows can require provenance information to promote repeatability and discovery of components. This provenance information is stored in Lume and can be enforced though provenance-enforcing workflows. For example, this can provide a check on each of the output Lumes to ensure that the correct processing steps were completed. In the validation stage, it can provide a means to track the provenance of the Lume Element that created the correct or incorrect metadata. Further, it can also track to ensure that all inputs are received as outputs.

Service Interoperability. The services provided by the System may require Swagger (YAML markup language) specifications, according to one embodiment of the invention. There may be many assumptions regarding business logic, order of operations and other data interpretations that are utilized to implement a System component. Identifying which components are interoperable may be achieved through the analysis of example workflows, rather than input and output specifications. In the System, a component may simply operate on a Lume and in the case of error return correct error codes and write the appropriate logging information.

Figure 4A:
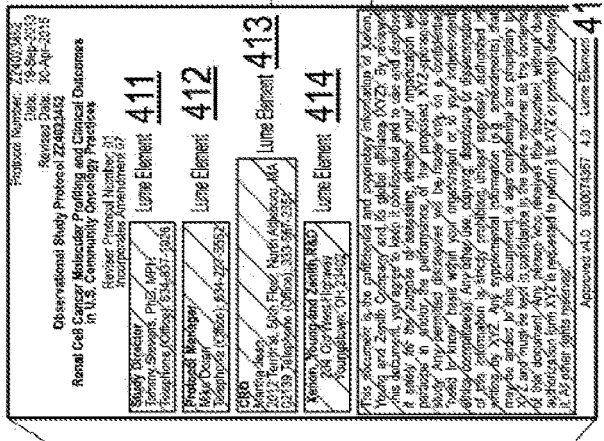
FIG. 4A is a drawing depicting an example of a Lume structure and example levels according to an exemplary embodiment of the invention.

FIG. 4A illustrates an example of the Lume structure and the initial conversion of different types of files into Lumes. As shown in FIG. 4A, dataset 410 refers to a body of different types of files or documents. These documents may initially be in different formats, e.g., such as Adobe portable document format (PDF), unstructured text files, Microsoft Word files, and HTML files.

FIG. 4A also illustrates an example of defined elements for the Lume. For example, a first element 411 may correspond to the study director including contact information; a second element may correspond to the protocol manager including contact information 412; a third element may correspond to the contract research organization (CRO) including contact information 413, a fourth element may correspond to a research & development company 414, and a fifth element 415 may correspond to a confidentiality notice for the document. FIG. 4B illustrates a larger view of the document with metadata depicted in FIG. 4A.

Also shown in FIG. 4A are example levels of element types. For example, the System may provide functionality to enable the user to identify individual paragraphs, tokens or entities, each of which can be extracted from the Lume.

Figure 5:
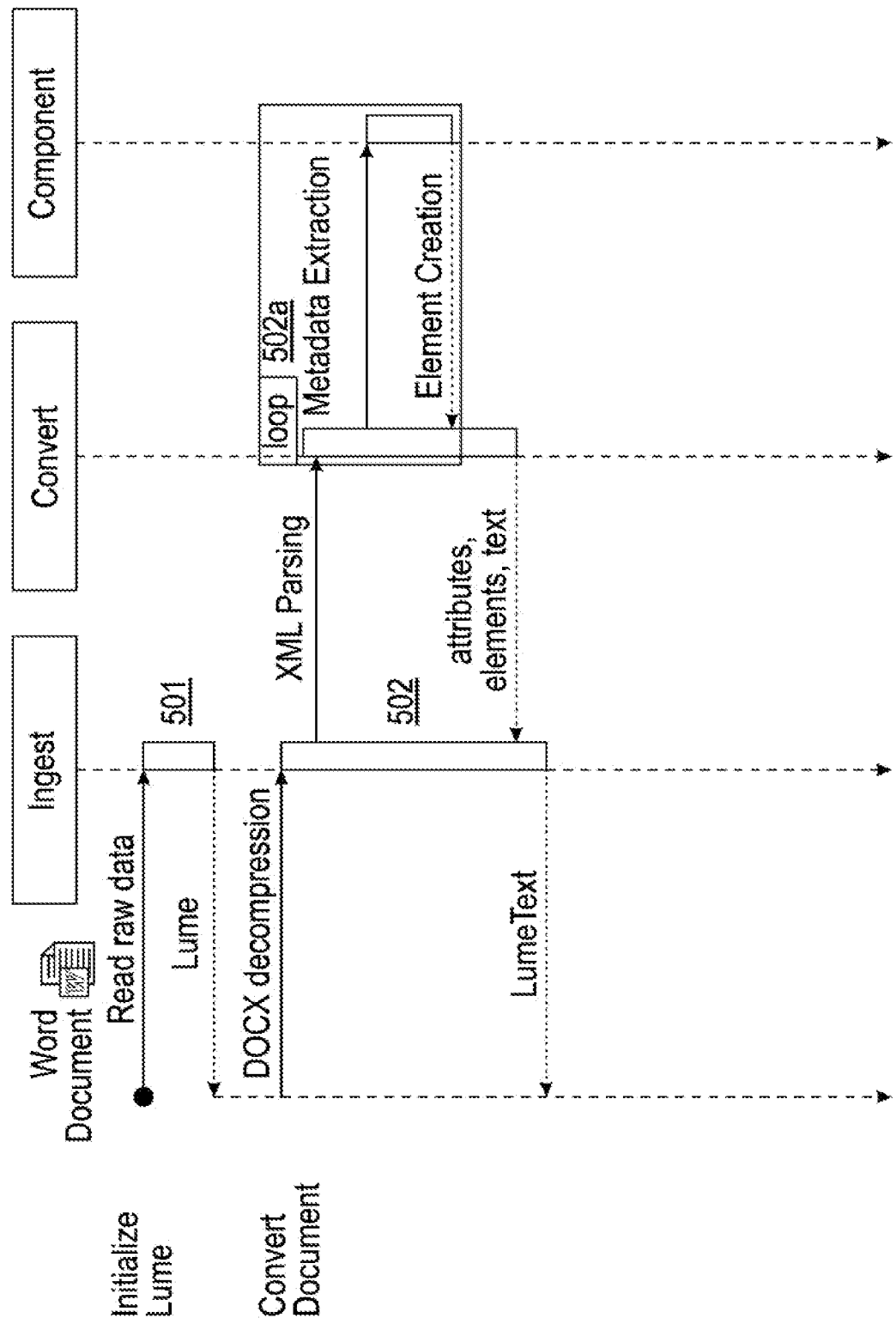
FIG. 5 is a drawing depicting a Lume creation process from a Microsoft Word document according to an exemplary embodiment of the invention.

FIG. 5 provides further detail of an example of a Lume creation from a Microsoft Word document. As shown in FIG. 5, the first step, i.e., step 501, is to initialize the original document. Initialization entails storing the original data in the Lume object. The second step, i.e., step 502, is to parse the document into elements in the Lume format. The step may include a loop 502a in which elements are created corresponding to metadata from the source document. This is performed by document specific components that ingest the specific format. In particular, during ingestion, (i) the original file is opened, (ii) the DOCX format is decompressed into an XML file, and then (iii) the XML file is read into a data structure for parsing. The parsing separates the data in the document from the metadata, and then stores the data in the "data" field of the Lume, and the metadata into Lume Elements. This will then be output as a LumeText. Examples of metadata stored are author, page, paragraph, and font information.

At the conclusion of the process shown in FIG. 5, the input document has been converted into Lume, and the desired elements have been generated and stored.

Figure 6:
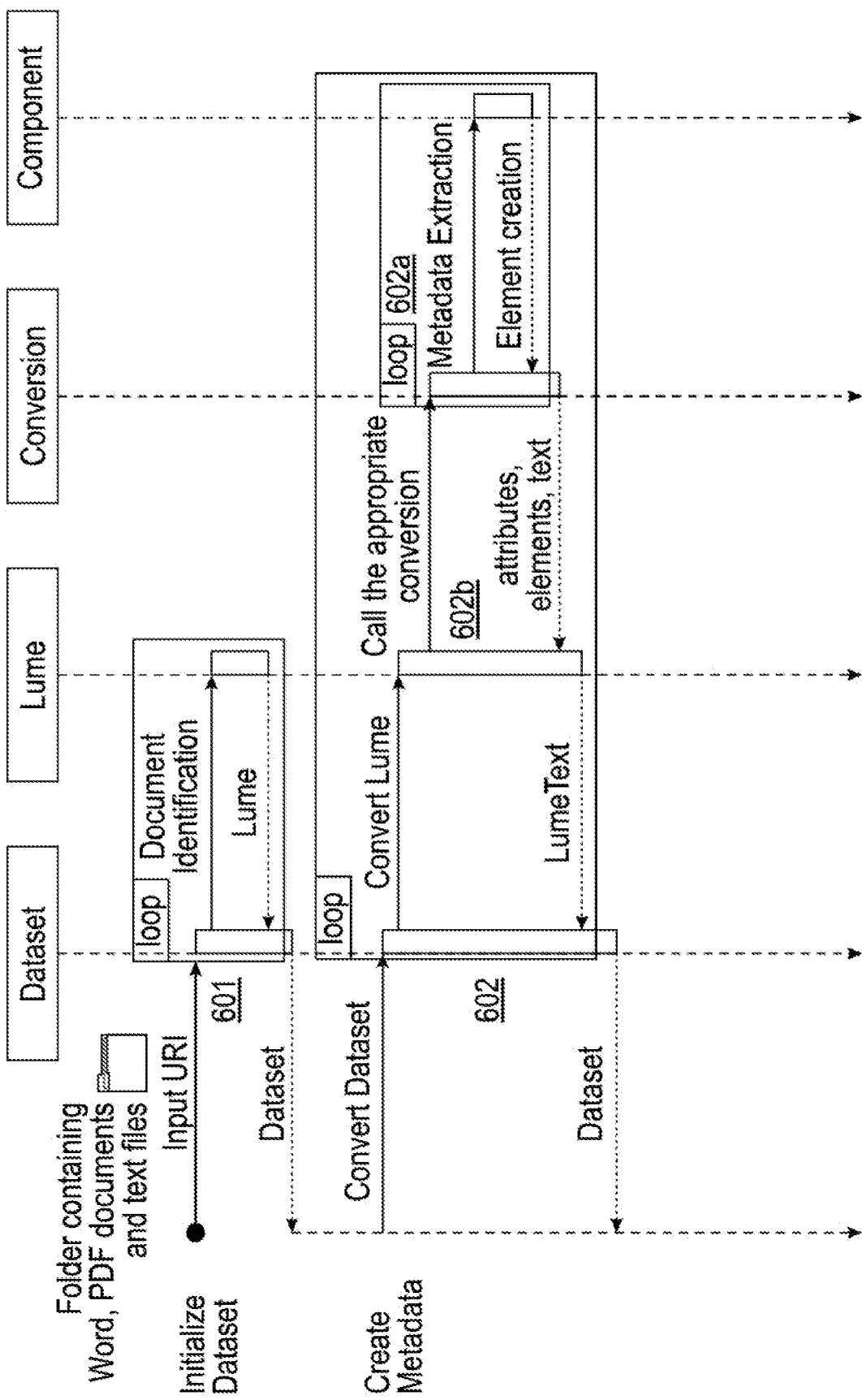
FIG. 6 is a drawing depicting a dataset creation process from a directory of Microsoft Word and text files according to an exemplary embodiment of the invention.

FIG. 6 illustrates an example of applying the functionality of FIG. 5 to a corpus of documents. The first step in FIG. 6, i.e., step 601, comprises initializing the dataset. The subsequent steps in FIG. 6 entail application of the processes shown in FIG. 5 to each document in the dataset. As the Lumes in the dataset are converted to Lume format in step 602, the results are stored in the dataset. The conversion includes the creation of the Lume data structure (i.e., loop 602b), the conversion of the format-specific metadata into Lume Elements (i.e., step 602a), and additional annotations that are needed, such as semantic annotation, natural language processing, creating domain-specific features, or a vectorization to a quantitative fingerprint. More specifically, in step 601, the dataset documents are identified in the URI, and then the Lumes containing the file data is passed to 602. Next, in 602b, the Lume is passed to the appropriate parser, which creates the appropriate data structure for parsing. In 602a, the parsing work through the document, parsing the data in the "data" field of the Lume, and the metadata into Lume Elements. This will then be output as a LumeText.

Figure 7:
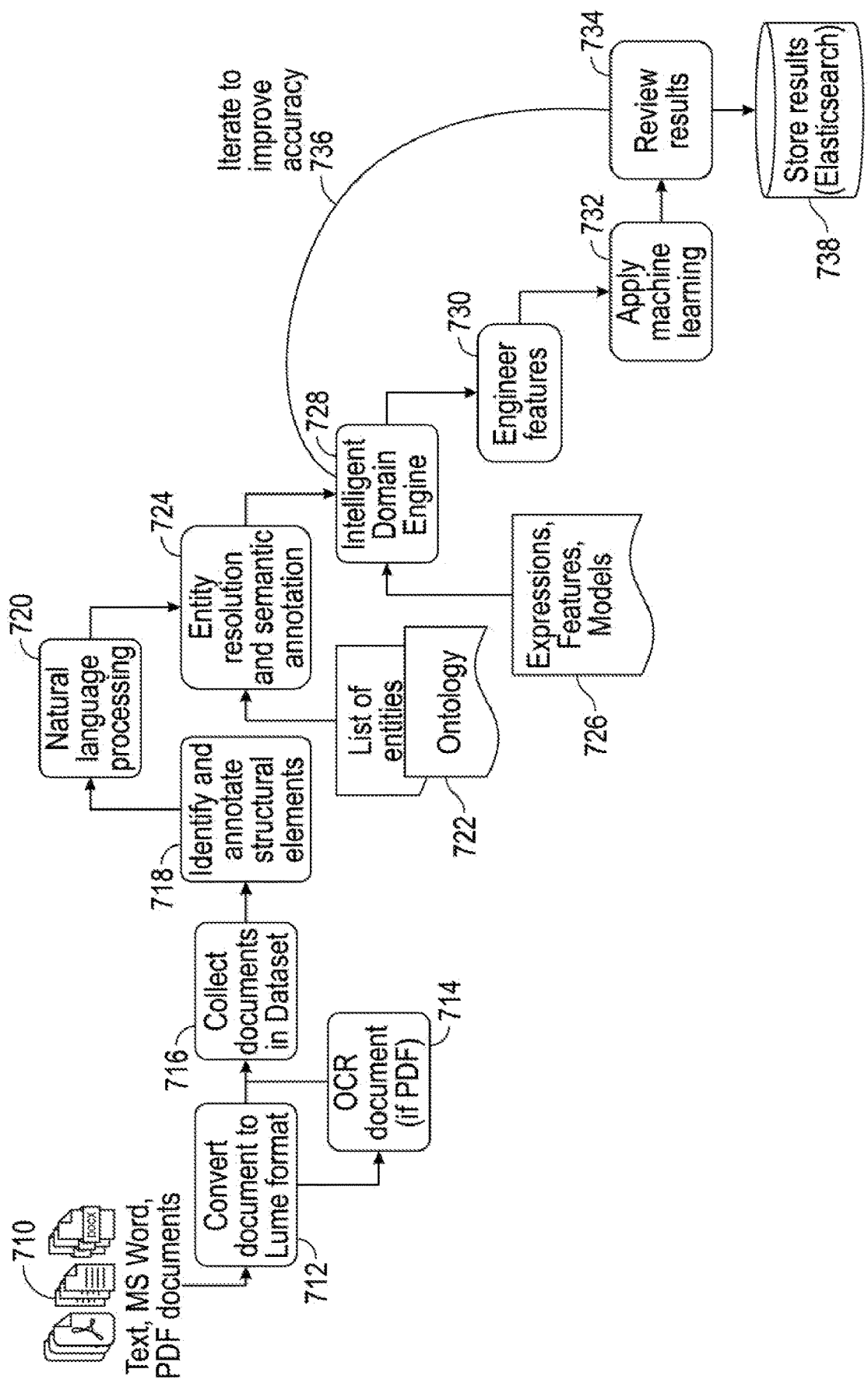
FIG. 7 is a flow diagram for the analysis system according to an exemplary embodiment of the invention.

FIG. 7 is a process diagram that illustrates an example of a process for analyzing structured and unstructured data according to an exemplary embodiment of the invention. In step 710, documents such as text, Microsoft Word, and/or Adobe PDF documents are ingested into the System. The documents are then converted in step 712 to Lume format as described above. An OCR process may be used in step 714 to convert an image file to characters. In step 716, the documents are collected in a Dataset. In step 718, the System identifies and annotates structural Lume Elements (e.g., see FIG. 6). Once the documents have been converted into Lume format and the Lume Elements have been generated, natural language processing (NLP) routines or components can be applied in step 720 to the Lume formatted information.

In step 722, a user of the System creates and inputs an ontology comprising a list of entities. According to one example, an ontology may describe the people and for which businesses they have been employees. The ontology can be useful for extracting people and businesses from documents in the platform, for example. Alternatively, the ontology can describe the different products of a company, the categories that they belong to, and any dependencies between them. Step 724 involves entity resolution and semantic annotation. Entity resolution determines which entities referred to in the data are actually the same real-world entities. This resolution is accomplished through the use of extracted data, ontologies and additional machine learning models. Semantic annotation relates phrases in the data to the formally-defined concepts defined on the ontologies. In the business employee example above, appearances of words "John Doe" will be identified, and connected with the employee John Doe in the ontology. This will enable downstream components to utilize additional information about John Doe, for example his title and function in the company.

In Step 726, a user of the System creates expressions that are to be applied to the documents stored in the dataset. The expressions may be, for example, comma-separated-value (CSV) files that specify patterns to search for or other distinguishing features of documents. The expressions may incorporate the expertise and know-how of subject matter experts. For example, an expression may identify various specific words and relationships between words, or patterns, that identify particular contract clauses or clauses in a tax document. These expressions are used to search for and identify particular aspects, clauses, or other identifying features of a document. The expression may also leverage a machine learning operator, pre-trained sequence labeling component, or an algorithmic parser that acts as one of the operators into the IDE.

In step 728, the expressions are input into an IDE, which reads the expressions and applies them to the dataset. According to one embodiment, the output may comprise predicted answers and support and justification for the answers. The IDE will be described further below in connection with FIGS. 8-12.

In step 730, the output of the IDE can be utilized to engineer additional features. This utilizes the previously created Lume Elements, and creates new Lume Elements corresponding to the additional features. The feature engineering can be thought abstractly as indicator functions over sets of Lume Elements to create features related to specific signals, for learning and inference tasks. In the general case, the feature engineering can generate additional categorical, or descriptive text features needed for sequence labelling, or sequence learning tasks. For example, the engineering can prepare features for custom entity tagging, identify relationships, or target a subset of elements for downstream learning.

In step 732, machine learning algorithms or routines are applied to generate results from the Lume Elements created upstream. The machine learning can also be replaced by sequence labelling, or Bayesian network analysis. This creates machine-learned scoring, or probabilistic information on the accuracy of prior annotations, the relationships between elements, or in conjunction with new annotations or classification metadata. The results are analyzed in step 734, where the results are provided to an analyst for review, either through a UI to inspect the annotations or a workbench to perform further analysis on the results. In step 736, one or more iterations are performed to improve predictive accuracy. The steps of applying the expressions 728, engineering features 730, applying machine learning 732, and reviewing results 734 may be repeated to improve accuracy. Once the accuracy has been improved to achieve a desired level, the results may be stored in a database in step 738. Note that entity resolution and semantic resolution 724, engineer features 730 and machine learning 734 will also be utilized within the Intelligent Domain Engine, but is separated in the case of large-scale processing pipelines.

According to an exemplary embodiment of the invention, the IDE comprises a platform for leveraging natural language processing, custom built annotation components, and manually encoded expressions to systematically classify and analyze a corpus of documents. The IDE can provide a platform for combining a company's cognitive/AI abilities with industry domain knowledge. Each document classification can be represented by a set of expressions that may include the features to be utilized, the patterns of the features to be identified, and reference location or scope information to focus the classification task. Expressions can be composed and work with Lume Elements and data contained in the Lume. The IDE can be designed to systematically evaluate expressions for each document in the corpus, producing specified results as well as annotated text supporting the classification determinations. Note that in this example, the IDE is utilized for natural language processing and text mining, however, the IDE framework applies to all Lume formats, such as images, audio, and video.

The IDE can provide a number of advantages. For example, the IDE can output annotated text to support classification decisions, in addition to an answer to a specific question. Annotations can be used to audit results and provide transparency. In addition, training an accurate machine learning model generally requires a large number of labeled documents. Using the IDE to integrate the domain knowledge with machine learning can reduce the number of documents needed to train an accurate model by an order of magnitude, by utilizing expert-derived features. This is because the machine learning problems involving unstructured data are generally overdetermined, and the ability to select accurate, and interpretable features requires more data than is generally available. For example, in documents, many tens of thousands of features can exist, including the dictionary of words, orthographic features, document structures, syntactic features, and semantic features. Furthermore, according to an exemplary embodiment of the invention, individuals such as subject matter experts (SMEs) who input expressions do not need computer coding skills, as expressions can be created using a domain specific language that can be codified in no-code environments, such as in spreadsheets (CSV or XLSX) or through an IDE user interface. Thereby the SME can create domain relevant features that can be leveraged for the machine training process. The IDE UI allows users to modify, delete and add expressions to the System and visualize elements created by executing the IDE. In addition, expressions can be designed to be interchangeable. They can be created for reuse in use cases throughout an industry or problem set. Additionally, the IDE can be designed to leverage the Lume format for storing and working with documents. This design allows the annotations and metadata to be inputs for the expressions, in addition to the textual features that exist in the document.

According to an exemplary embodiment of the invention, the process for creating and using an expression involves: (1) reviewing documents manually, (2) capturing patterns through expressions and creating custom built code that may leverage machine learning or statistical extraction, (3) loading expressions into the IDE and running the IDE, (4) building confusion matrices and accuracy statistics (i.e., by comparing the current results on an unseen set of documents, this creates an estimate of how well the expressions will generalize, and determines whether the System meets the performance requirements), (5) iterating and refining the foregoing steps, and (6) producing output, such as predicted answers and sections providing support and justification for answers.

Figure 8:
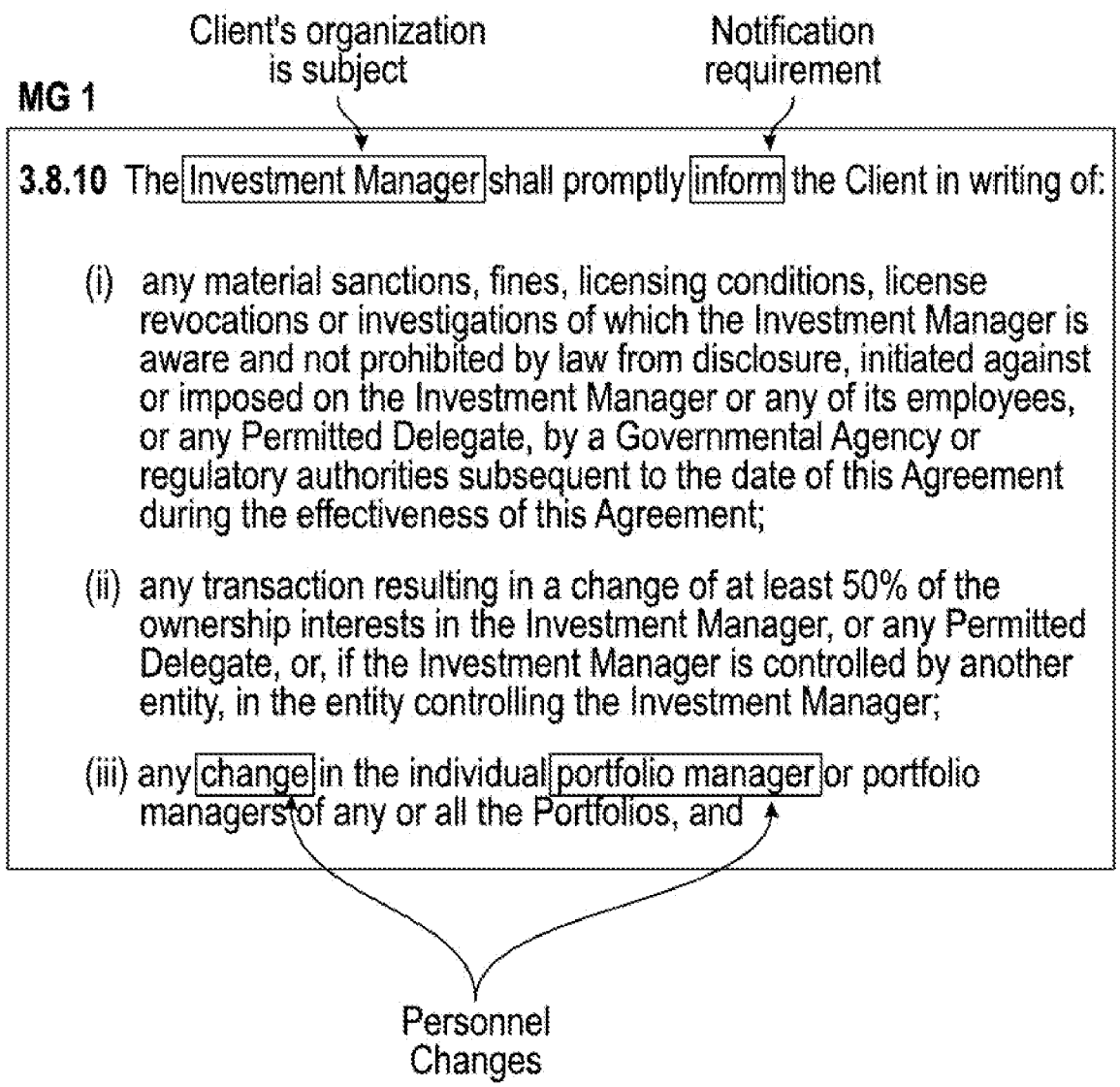
FIG. 8 illustrates an example of a document to be ingested and analyzed by the analysis system according to an exemplary embodiment of the invention.

According to one particular example, the IDE may be used to automatically determine answers to legal questions by analyzing documents such as investment management agreements or other legal documents. For the purpose of illustration, in this particular example suppose a company has 8 legal questions to answer in connection with 500 investment management agreements. An example question might be "Does the contract require notification in connection with identified personnel changes?" FIG. 8 depicts an example of sections of an investment management contract relevant to the legal question.

FIG. 9 illustrates examples of expressions according to one embodiment of the invention. As shown in FIG. 9, the expressions may be detailed in a table format (such as CSV), rather than in code. In the FIG. 9 example, each expression has a "name," which may be useful when referencing other expressions. The name may also be used by the output file to create features. Each expression may also contain a "scope," which focuses and limits expressions to be applied. The scope itself is evaluated as an expression, and its results are used to limit the scope of the parent expression. For example, a scope expression may refer to Lume Elements (where it is pre-specified in the conversion to the Lume format or is created by another expression), or can be the result of an operator that identifies the appropriate clause in a contract. The expression also includes a "string" field which is where the expression is contained. The string field has a predetermined syntax. The string field can specify patterns to look for in the documents or logical operations. FIG. 9 shows examples of the string field.

The expression may also include a "condition" field, which is used to determine whether the particular expression should be evaluated or not. This is useful in enabling or disabling expressions for computational efficiency, or to implement control logic to enable or disable certain types of processing.

An expression may be used to search for patterns in documents, and the expression may encapsulate those patterns. Examples of such patterns include, for example, different ways to express a notification requirement and personnel changes. For example, there are many words for "personnel" such as "key person," "investment team," "professional staff," "senior staff," "senior officers," "portfolio manager," "portfolio managers," "investment managers," "key decision makers," "key employees," and "investment manager." Case sensitivity will matter in some cases. For example, "investment manager" may refer to an employee; whereas "investment manager" may refer to the client's investment organization. The order of words (indicating a subject-object relationship) will matter in some cases. For example, an investment manager notifying the client is not the same as the client notifying the investment manager. All of these types of patterns can be encapsulated in the expressions. Subject matter experts (SMEs) can encapsulate in the expressions their know-how in analyzing certain types of specialized document types.

FIG. 10 illustrates an example of one form of output from the IDE: predicted answers. It includes answers to each question for each document. For example, as shown in FIG. 10, the output may comprise a table listing the filename of the input file, an answer to four questions that provide determinations on features of the contract. According to an embodiment, there may be many more questions or features that will be output from the IDE.

FIG. 11 illustrates an example of another form of out from the IDE: support and justification for the answers. In FIG. 11, the user interface displays the actual contract language used by the IDE to support and justify its given answer. The actual contract language is presented so that a user can evaluate whether the IDE is correct. The System can utilize information stored in the Lume Element to highlight certain words in the text that specifically form the basis for the answer provided by the IDE. In this way, the IDE enables a human user to easily verify whether the answer is correct. It also facilitates the user's ability to understand any errors and to refine the expression to correct such errors.

Figure 12:
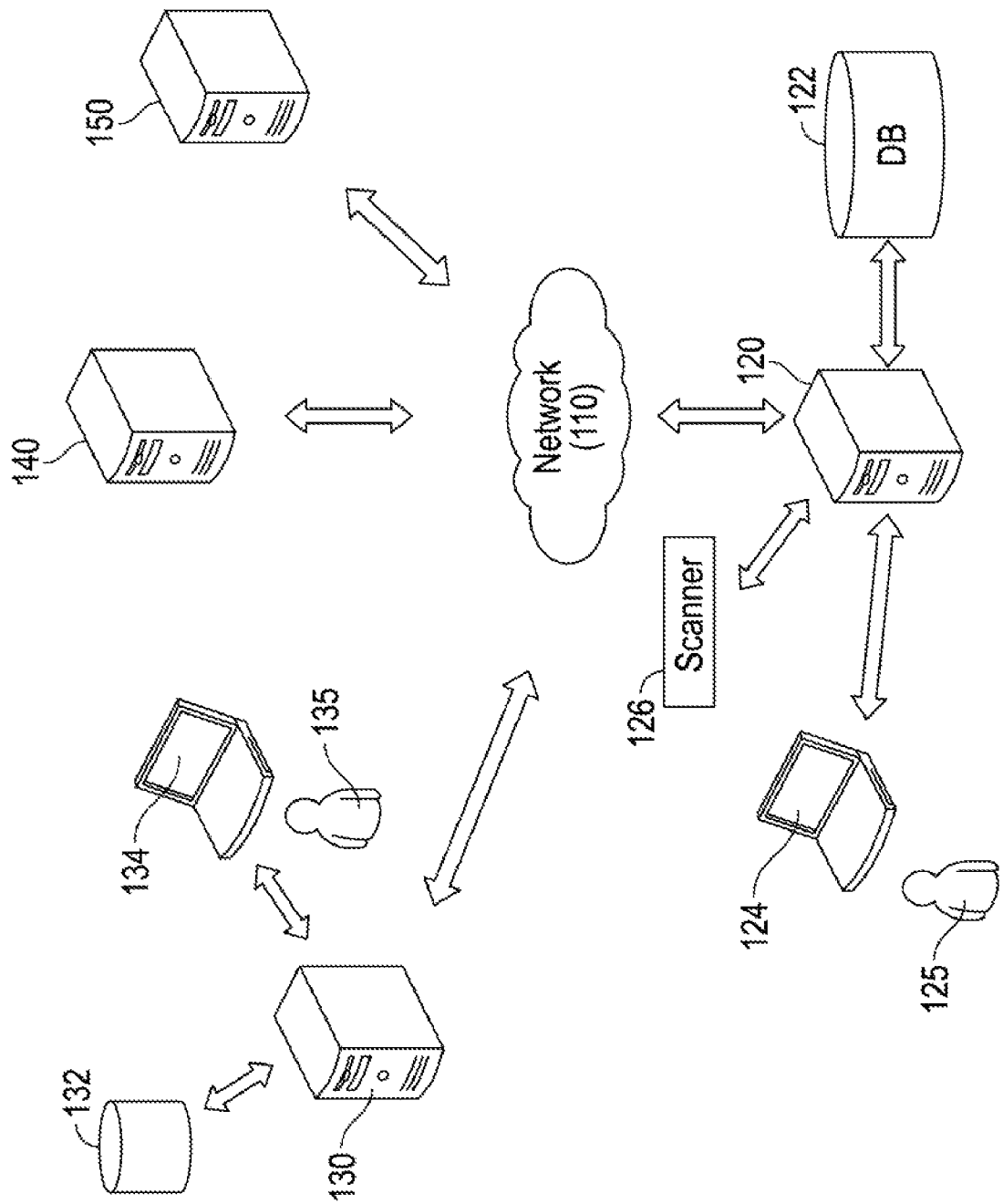
FIG. 12 is a system diagram of the analysis system according to an exemplary embodiment of the invention.

FIG. 12 is a system diagram of the System according to an exemplary embodiment of the invention. As shown in FIG. 12, the System may comprise a server 120 and associated database 122 along with the software and data that are used to run the System. The System may also include a scanner 126 used to scan and ingest original documents into the System. The server 120 and database 122 may be used to store the ingested documents, as well as to store the IDE, the Lumes and Lume Elements, and the other software and data used by the System. A user 125 such as a subject matter expert (e.g., tax professional) can access and use the server 120, scanner 126, and database 122 through a personal computing device 124, such as a laptop computer, desktop computer, or tablet computer, for example.

The System may also be configured to allow one or more clients or other users to access the System. For example, as shown in FIG. 12, a client 135 may use a personal computing device 134 and company server 130 to access the server 120 via network 110. The client may also transmit client-specific data (e.g., a set of contracts to be analyzed) stored in a client database 132 to the System to be incorporated into the Dataset documents to be analyzed by the server 120 and stored in the database 122. The server 120 shown in FIG. 12 can receive other documents, spreadsheets, pdf files, text files, audio files, video files, and other structured and unstructured data from other clients or users, represented generally by servers 140 and 150.

Also shown in FIG. 12 is a network 110. The network 110 may comprise any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. The other computing devices, such as servers, desktop computers, laptop computers, and mobile computers, may be operated by different individuals or groups, for example, and may transmit data such as contracts or insurance policies to the server 120 and database 122 via the network 110. In addition, cloud-based architectures, with containerized or microservices-based architectures may also be used to deploy the System.

An embodiment of the present invention is directed to a Securities Analyzer that provides portfolio, asset and risk managers new insights into their exposures relating to environmental social governance (ESG) compliance and analytics on asset-backed securities. According to an exemplary embodiment, the Securities Analyzer generates responses to specific terms, rates, legal constructs, etc. An exemplary application may apply to the transition and phasing out of LIBOR. As part of the global LIBOR transition, an embodiment of the present invention is directed to a scalable and robust solution to answer LIBOR transition questions across asset manager portfolios. The Securities Analyzer leverages AI/ML components including: (1) data structure, e.g., LUME; (2) computer programming language to orchestrate multiple steps in an AI workflow; and (3) intelligent domain engine (IDE) that leverages natural language processing to systematically classify and analyze a corpus of documents.

Currently, the scope, cost and complexity of sourcing and analyzing global publicly traded security documents, private placement memoranda, and Form 144A filings are significant. The Securities Analyzer of an embodiment of the present invention sources international fixed income securities documents; answers pre-defined, industry-vetted, LIBOR transition questions; and rapidly delivers through a purpose-built, web-interface. The securities documents cover RMBS, ABS, CMBS, CLO, CDO, CLN, Corporate, Agency, Municipal, Government, Supranational, etc.

In addition, the innovative Securities Analyzer provides coverage check and review. Coverage check may involve providing a list of securities identifiers; checking for data and documents and confirming analyzable universe. The review involves provisioning a web application and accessing results.

LIBOR has been considered a ubiquitous rate impacting 300 to 400 trillion dollars of financial contracts (e.g., derivatives, loans, mortgages, etc.). An embodiment of the present invention addresses the elimination of LIBOR as an interest rate. While the exemplary illustrations and examples relate to the elimination of LIBOR, an embodiment of the present invention may be applied to other rates, terms and provisions. In addition, an embodiment of the present invention may extend to other variations including environmental social governance (ESG) provisions for securities and loans.

In some instances, a securities document may explicitly reference LIBOR, in which case the process may be considered straight-forward. When referencing LIBOR, some instruments may include a provision that deals with the unavailability of LIBOR and further identifies an action or response. The action or response, however, may not be easily discernable and require further interpretation and additional analysis. For example, some provisions may mention LIBOR but fail to provide clear guidance in the event LIBOR is not available.

Each asset-backed security generally has a set of corresponding documents. Some of these documents may span hundreds and hundreds of pages. Current tools treat each document independently. However, an embodiment of the present invention identifies linkages and lineages to understand how documents and portions of documents relate to each other. This information may be critical to determine which language governs, controls and/or supersedes. Additional information may include the type of document, when it was published and business context.

An embodiment of the present invention is directed to applying business logic to answer questions relating to LIBOR, for example, based on the set of corresponding documents. The questions may relate to determining whether LIBOR is present or not at the deal or asset level. The question may dictate which documents are analyzed. For example, an embodiment of the present invention may determine whether LIBOR is present in the set of documents. In another example, an embodiment of the present invention may identify permanent successor language and determine how it is used in more recent documents. For some issues, an embodiment of the present invention may focus on recent documents as provisions in more recent documents will govern and/or supersede earlier ones.

An embodiment of the present invention is directed to a user interface that enables clients and other users to interact with the Securities Analyzer. For example, users such as portfolio managers may use the Securities Analyzer to make decisions based on a risk profile or other assessment. In addition, the user interface enables clients to access and view the securities in their portfolio. Other determinations, actions and/or responses may be generated.

An embodiment of the present invention may provide an answer (e.g., date, term, etc.) in response to a question and then provide supporting evidence in the documents. An embodiment of the present invention is directed to providing transparency to how decisions are made as well as facilitate access to supporting evidence, documents, etc. In addition, a user may further drilldown into the supporting evidence. For each question, a corresponding answer may be based on a different document or set of documents. For example, the system may identify fallback language which requires a survey of banks and if banks are not available, then a last known LIBOR rate would apply. Upon making this determination, an interactive user interface of an embodiment of the present invention may identify and present the actual corresponding LIBOR language in a supporting document. This feature also enables a user to confirm and/or analyze supporting data, documents, etc.

If a user disagrees with an answer and/or supporting document evidence, the user may override the answer and provide an annotation. The annotation may also identify supporting text and/or other evidence. This provides a human in the loop functionality. Overriding the answer ensures that the correct information flows back into the system to then re-train and fine-tune the model.

An embodiment of the present invention provides insights that enable clients to make informed buy, sell and hold decisions and further hedge against risk. For example, an embodiment of the present invention may identify securities that transition from a floating LIBOR rate to a fixed rate. The system may identify this as a risk because the security was purchased as a variable rate rather than a fixed rate. According to another example, the system may identify replacement language when LIBOR is not available. This scenario corresponds to low risk. In another instance, there may be no LIBOR language detected which would translate to high risk.

Data sources may include documents in various formats including PDF, Tiff, Public, Private, HTML, conversion, etc. In addition, an embodiment of the present invention may be extended to consider other documents and sources. For example, a user may identify private documents such as private loans, credit agreements, etc. An embodiment of the present invention may blend these private documents with the corpus of public information. Accordingly, a user may connect and/or combine the user's own data sources, perform processing in the pipeline of the Securities Analyzer and then view and/or access results.

An embodiment of the present invention may leverage third party data sources and other external data. This may be relevant for securities related to environmental social governance (ESG). For example, an embodiment of the present invention may connect to a certification database or energy ratings source to determine analytics relating to a particular security, such as a commercial mortgage backed security. The analytics may support a green score determination.

An embodiment of the present invention may be applied to various applications, other security documents and use cases. An extension may relate to integrating an ESG engine for asset-backed securities. This may be used to assess risk and make other determinations including risk mitigation for other downstream services/systems. For an ESG embodiment, a set of questions specific to ESG may be applied.

An embodiment of the present invention may be directed to amendment generation capabilities and other downstream processes. For example, based on the LIBOR analysis, an amendment for a particular security type may be generated. The system may recommend an amendment and then inject corresponding terms and values into a template which may then be transmitted or shared with a legal entity for approval.

An embodiment of the present invention may assist with product or portfolio creation. For example, an asset manager may use the system to design a portfolio for a client and further tailor an asset-backed portfolio. In this example, the user may represent an asset manager who may access a profile, such as an ESG profile, to create a portfolio for an environmentally conscious client. The asset manager may focus on government risk protection as well as social and community benefits and contributions.

An embodiment of the present invention enables a user to make refinements and provide feedback. For example, the system may identify permanent cessation language. The system may apply a set of terms and through experience and review, it may become apparent to a subject matter expert (SME) that there are additional new terms that apply. The system model may be updated to include those new terms. In another scenario, a user may notice that the system is not identifying certain expected terms and submit an alert to the system for correction and improved accuracy. Other types of feedback and refinement may be applied.

An embodiment of the present invention may further integrate and support SMEs through a human in the loop application. In this scenario, an embodiment of the present invention may handle straight-forward matters and surface the more difficult tasks to a SME to provide insights and make a final determination.

Figure 13:
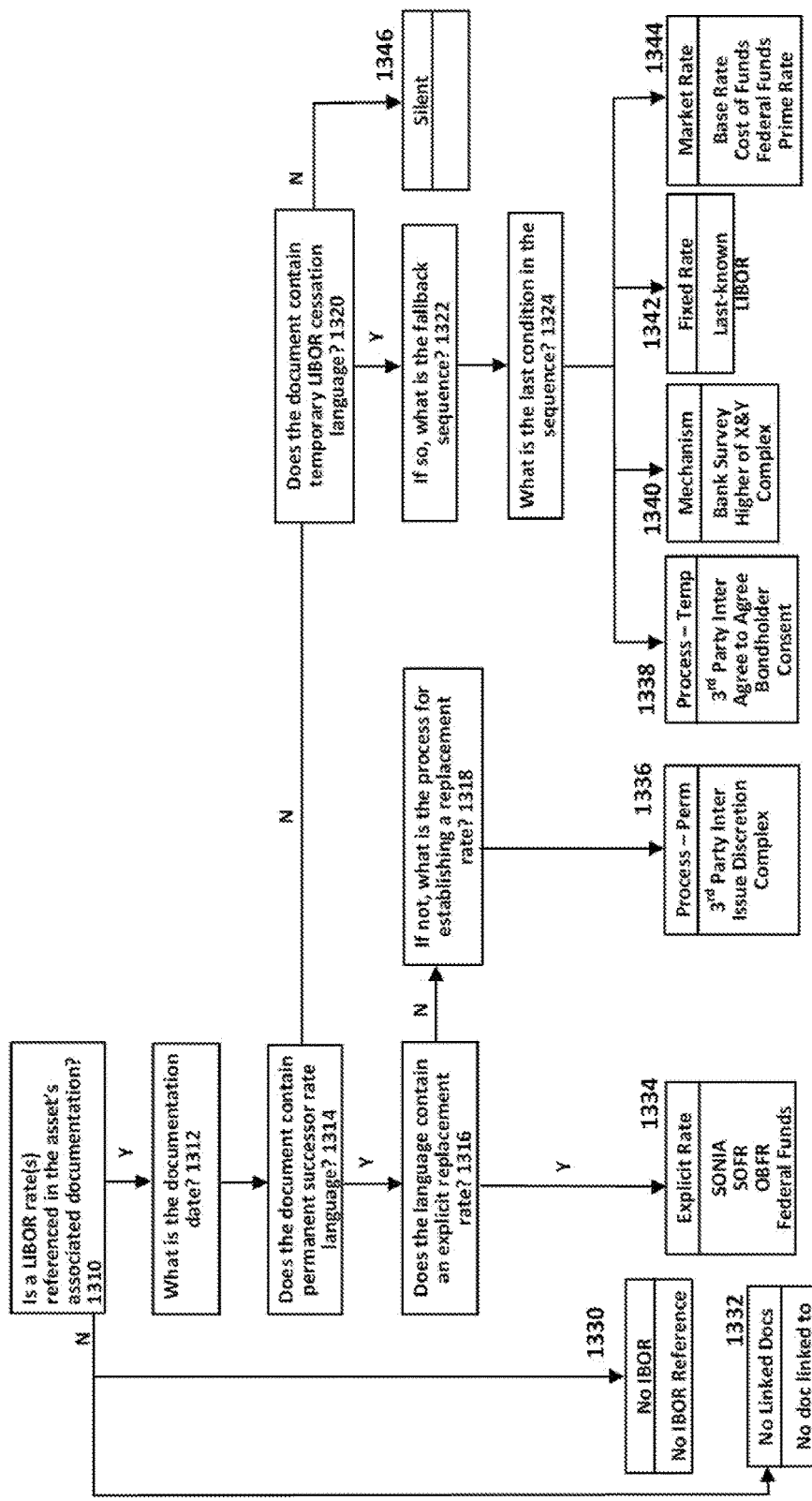
FIG. 13 is an exemplary flow diagram, according to an embodiment of the present invention.

FIG. 13 is an exemplary flow diagram, according to an embodiment of the present invention. Step 1310 determines whether LIBOR rates are referenced in an asset's associated documentation. If not, then "No IBOR" is noted meaning none of an asset's associated documents reference LIBOR or other related rate. If documents are not available, then "No Linked Docs" status is applied at 1332. "No Linked Docs" 1332 indicates that the asset does not have any available prospectus or other governing documentation available in the system. This is most often due to sharing limitations placed on Rule 144A and other private deal documentation. "Explicit Rate" 1334 indicates that an asset's rate is permanently and explicitly replaced by a new rate such as SONIA, SOFR, OBFR, Federal Funds, or AMERIBOR.

Step 1312 determines the documentation date. Step 1314 determines whether the document contains permanent successor rate language. If yes, step 1316 determines whether the language contains an explicit replacement rate. If yes, explicit rate categories at 1334 may be applied. If not, step 1318 identifies the process for establishing a replacement rate. Process-Perm 1336 represents a process for replacing LIBOR if or when the rate is permanently discontinued.

If the document does not contain permanent success rate language, step 1320 determines whether the document contains temporary LIBOR cessation language. If yes, step 1322 identifies a fallback sequence. If not, status is updated as "Silent" which indicates that no fallback language is present in the available documentation.

Step 1324 identifies the last condition in the sequence.

Process—Temp 1338 represents a process that determines LIBOR in the event that it is temporarily unavailability, e.g., during a market disruption event.

Mechanism 1340 represents a LIBOR determination process that falls outside of the core security stakeholders (e.g., bondholder, issuer, calculation agent) explicitly deciding or negotiating the replacement rate. This may include bank surveys, calculating the higher of two or more stated rates, or deciphering a more complex process.

Fixed Rate 1342 represents a situation when a floating rate security effectively becomes a fixed-rate instrument. This typically occurs when there is no permanent replacement language and the last stop on the temporary fallback waterfall is Last-Known LIBOR. For example, if Last-Known LIBOR is 2.5%, the bond's interest rate effectively gets stuck at 2.5%+ the stated spread.

Market Rate 1344 represents a generic term used to cover commonly quoted market rates such as Cost of Funds, Federal Funds, etc.

An embodiment of the present invention may include various combinations of features and functionality. For example, the system may provide rapid assessment and LIBOR language analysis. Features may include: pre-defined industry-vetted LIBOR transition questions; asset level outputs for various covered assets in portfolio; embedded document roll-up logic to sequence documents by date, handle amendments and multi-document packages; rapid delivery through security identifier linking and enterprise quality data sourcing and output file for client-side ingestion, visualization, and bespoke analysis.

Other features may include an interactive user interface that provides summary views, metadata, document viewer and reports. For example, this may include: purpose-built user interface; pre-defined language groupings; summary, filtering, and reporting views; descriptive metadata; document review capability; "jump-to" supporting text navigation to validate answers against the original document and exports for asset-level output, document-level output, etc.

Additional features may include non-public document analysis, additional security types, custom question sets, application customization, etc. Features may be tailored to specific needs and may further include: non-public document analysis; additional security types; custom question sets; key data element extraction; application customization and integration; and asset similarity scoring, screening, and recommendation engines.

Figure 14:
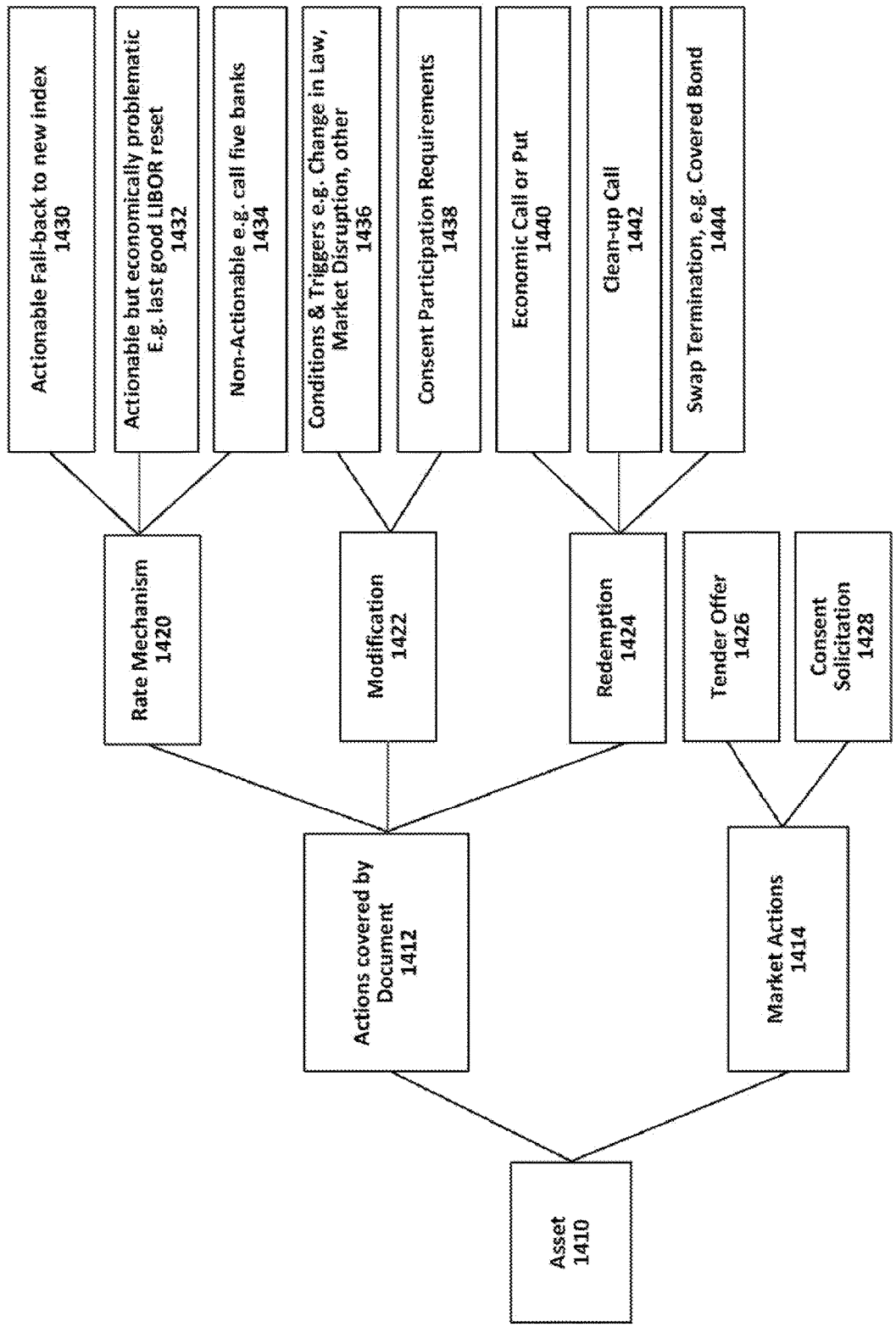
FIG. 14 is an exemplary flowchart illustrating actionable risk assessment, according to an embodiment of the present invention.

FIG. 14 is an exemplary flowchart illustrating actionable risk assessment, according to an embodiment of the present invention.

In general, securities cannot be modified via amendment. The terms stated in the offering documents at time of issuance are binding throughout the life of the instrument. Issuers can undertake market actions including: consent solicitation and tender offer. Courses of action for holders may include: liquidate positions; add to favorable positions; participate in consents or tenders and attempt negotiations with underwriters and issuers.

Asset 1410 may represent a security or other financial instrument. As shown in FIG. 14, 1412 represents actions covered by one or more corresponding documents. Actions may include Rate Mechanism 1420, Modification 1422 and Redemption 1424. Rate Mechanism 1420 may represent an actionable fall-back to new index at 1430; actionable but economically problematic at 1432 (e.g., last good LIBOR reset); and non-actionable 1434 (e.g., call five banks). Modification 1422 may represent conditions and triggers 1436 (e.g., change in law, market disruption, etc.); and consent participation requirements 1438. Redemption 1424 may include economic call or put 1440, clean-up call 1442 and swap termination 1444 (e.g., covered bond).

Market Actions 1414 may include Tender Offer 1426 and Consent Solicitation 1428.

An embodiment of the present invention may integrate with a global AI platform with a modular component architecture. The details of the AI platform are provided in the description above in connection with FIGS. 1-12. The AI platform unlocks the value of unstructured data with precision on complex problems.

According to an embodiment of the present invention, the AI platform may include a global artificial intelligence accelerator. The AI platform may be leveraged to perform a variety of use cases, such as automating lease review, contract management, tax form reading, and others. The AI Platform provides flexible deployment and consumption. For example, the AI Platform may be optimized for rapid deployment in the cloud and may be flexible enough to deploy on end user products including laptops. In addition, business and data scientists may interact with the user interfaces to provide human-in-the-loop input.

An embodiment of the present invention is directed to a user interface including a web application designed to assist with the transition away from LIBOR. The user interface may be built on a corpus of public debt securities documents where the system leverages AI to answer a set of LIBOR transition questions. The user interface may execute a web application having multiple views such as Summary View, Asset View and Document View.

The Summary View provides data on an entire portfolio with the ability to filter on various asset details as well as LIBOR terms. The Asset View provides final answers at the asset level. The answers may represent rolling best-available answers from underlying legal documentation. The Document View is a granular view in the application, providing extracted answers, supporting information, and/or document search. In addition, the web application may provide reporting functionality including the ability to export various reports, such as asset-level report, document-level report, etc.

Figure 15:
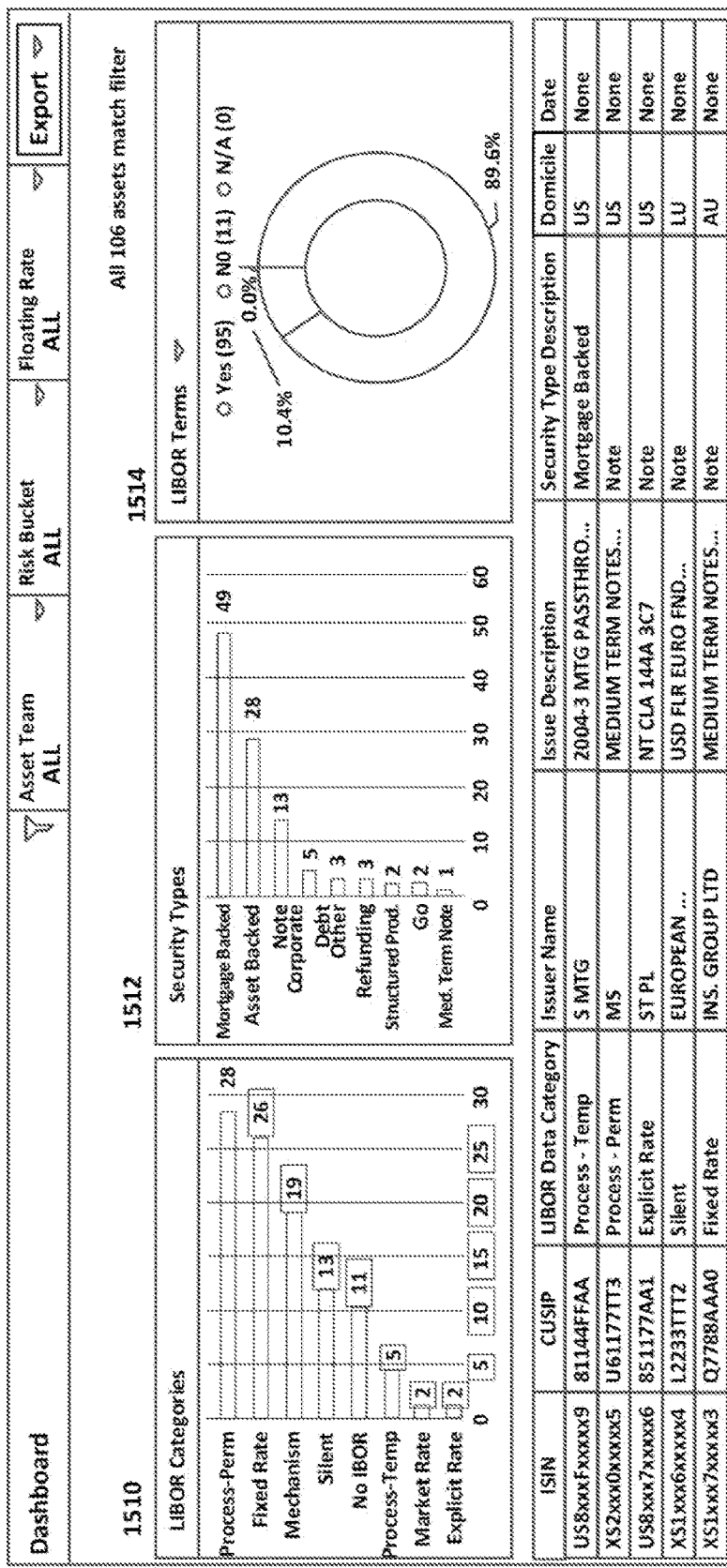
FIG. 15 is an exemplary summary view, according to an embodiment of the present invention.

FIG. 15 is an exemplary summary view, according to an embodiment of the present invention. FIG. 15 provides summary statistics which may include LIBOR categories 1510, Security types 1512, LIBOR terms 1514, etc. LIBOR Categories 1510 may include LIBOR fallback language data categories. Security Types 1512 may include portfolio summary of assets by security type. LIBOR Terms 1514 may represent a dynamic graphic where a dropdown selection gives the user the ability to view high-level stats for each question. Other options in addition to LIBOR Terms may include: Succession Language; Explicit Rate; Process-Perm; Cessation Language; Last Condition; Interest Floor; Governing Law; Consent Solicitation; Degree of Consent, etc. For example, governing law may indicate which statutes govern, e.g., which court governs if there is a dispute. If a governing law provision is missing, it may contribute to a high risk determination.

FIG. 15 also provides Asset ID and column search at 1516. Filtering may be available within each column. In addition, a user may jump or navigate to an asset view or other view.

An embodiment of the present invention is directed to providing an Event Log. An exemplary Event Log details actions and when such actions occurred. Actions may include a number of assets added to a portfolio; a number of assets ready for purchase; assets removed from the portfolio, a LIBOR category change, etc. A corresponding date-time stamp may be provided along with asset level details. For example, a user may interact with an alert icon that provides portfolio events such as added/removed securities; changes to data categories; changes to answers, etc.

An Add Securities feature gives authorized users the ability to add securities to their portfolio. An embodiment of the present invention provides the ability to request securities for purchase and add them to a user's dashboard. Securities may be added by entering identifiers, such as CUSIPS, ISINS. These identifiers may be entered directly into an interface of an Add Securities window. In addition, securities may be added by uploading a file. Identifiers may be added to a template provided in an interface of an Add Securities window. This file may be saved to the user's computer and then uploaded to the tab by dropping, pasting, or browsing for the file.

With a Tracked Securities feature, securities that were requested but are not yet available in the system may be identified and monitored. Securities may be identified by an identifier (e.g., ISIN, CUSIP), search value, status and/or other feature or characteristic. The Track Securities feature enables a user to keep track of requested securities directly in the platform. For example, status may indicate whether an analytical output is available in the system. Status may include not ready, ready, etc. Not Ready status indicates that documents are not currently available or they are in process of being pulled and processed. Ready status indicates a valid output is available in the application and the asset is ready to be added to the portfolio. Other status indicators may be applied.

In addition, export and reporting functionality may be provided. This enables data to be exported as an asset-level report, document-level report, etc. Other outputs and/or reports are available.

FIG. 16 is an exemplary asset view, according to an embodiment of the present invention. Asset view may provide detailed information relating to assets. Section 1610 may include descriptive asset metadata that provides key information related to the asset under review.

Supporting documents 1612 may represent documents and/or other evidence and support linked to the asset. By clicking on the document file name, a Document View page may be accessed. This view also provides data information including extracted document date, used to sequence documents and determine priority. For a particular bond, there may be a set of supporting documents, e.g., 17 documents. These documents may provide the basis for which to answer the set of questions.

Questions 1614 may represent asset-level answers based on document roll-up logic. By clicking on document icon, the user may jump to document(s) associated with the specific question/answer. In the example of FIG. 16, there are 10 questions presented and corresponding answers and links to supporting data. For each asset, an embodiment of the present invention may perform an assessment to address questions such as: Is an IBOR rate referenced in the document? Does the document contain permanent IBOR succession language? Does the document contain temporary IBOR unavailability language?

An embodiment of the present invention recognizes that there may be different answers for different documents. Within the set of documents, one document may mention a temporary fallback and another may identify a permanent fall back. Business logic may be applied to resolve disagreements and/or address agreements in documents.

An embodiment of the present invention may implement a customized set of questions. For example, a set of exemplary questions (that solve LIBOR challenge) may be applied across securities asset classes. This may include CMBS, RMBS, commercial loans, private credit agreements, etc. According to another example, some applications may involve 50 questions. In addition, other applications may require specific data elements to be extracted. A client may need to perform a covenant analysis which would require extraction and analysis of specific provisions and/or terms. Other variations and customizations may be applied.

An embodiment of the present invention may facilitate generating and implementing direct amendments. For example, it may be determined that a fallback position needs to be amended to make the instrument more robust and safe. This may involve communicating to a counterparty, legal or other entity/recipient.

FIG. 17 is an exemplary document view, according to an embodiment of the present invention. Document view provides asset details at 1710. This may include descriptive asset metadata that provides key information related to the asset under review.

Questions 1712 represent LIBOR questions and their extracted answers for the document under review. Hovering over the icon 1714 provides the supporting text snippet related to the question and answer under review. For example, clicking on the icon will take the user to the page in the document where the answer was extracted from.

In addition, document view provides highlighting supporting text for the selected answer at 1716. As shown in FIG. 17, an embodiment of the present invention provides legal text and supporting sections where the answer was extracted from. The supporting sections may be highlighted so the user may easily access. This feature provides fully traceability and transparency.

Figure 18:
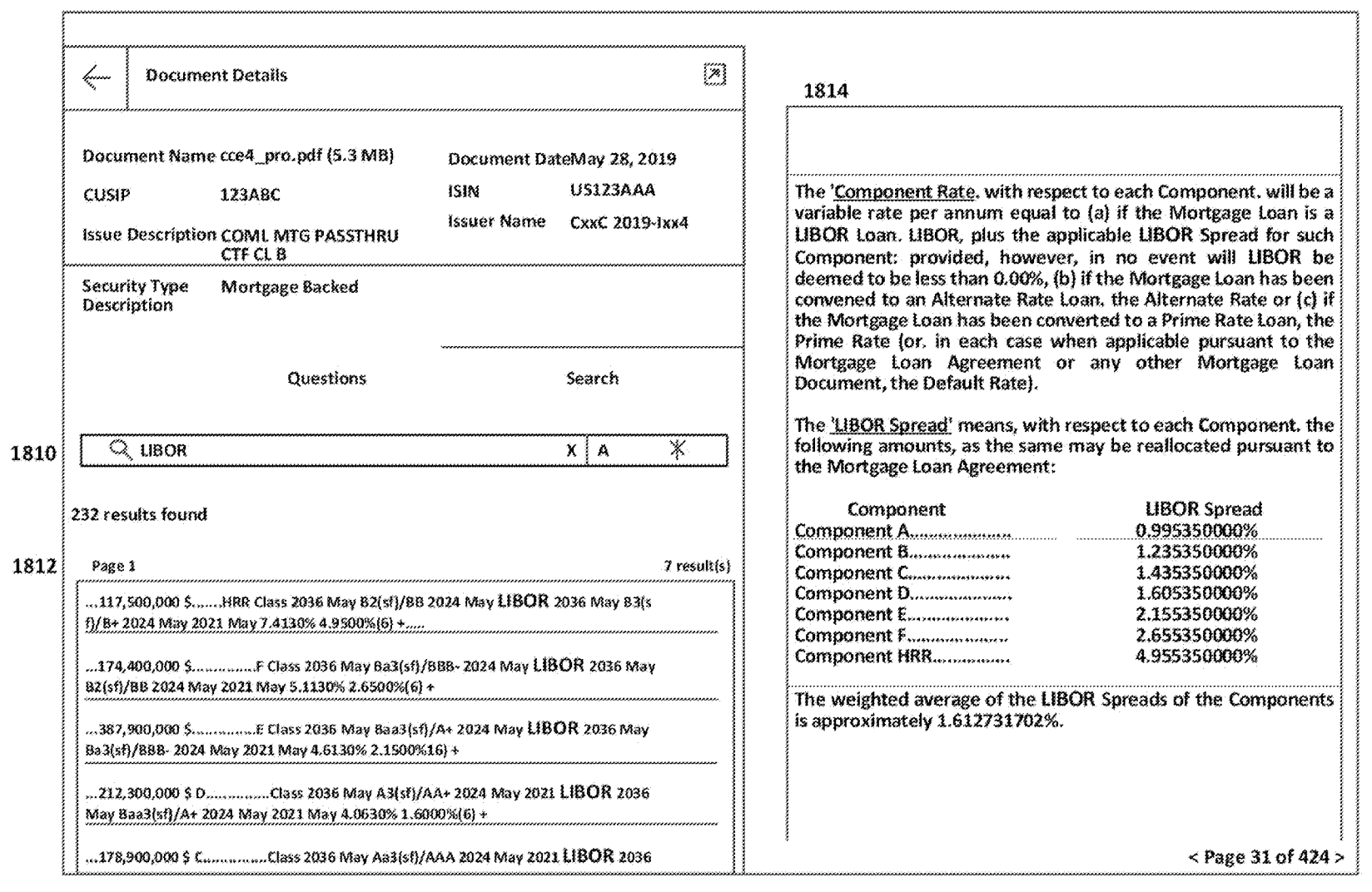

FIG. 18 is an exemplary document view, according to an embodiment of the present invention. Document view provides document details and enables a full text document search at 1810. The search functions may be case sensitive, case in-sensitive, fuzzy match and pattern matching (e.g., CUSIP, ISIN).

Search summary may be provided at 1812. Search summary details may include: frequency of search term found in document; results summary with context; jump-to results functionality and search term highlighting. In addition, document view provides highlighting supporting text for the selected answer at 1814.

Figure 19:
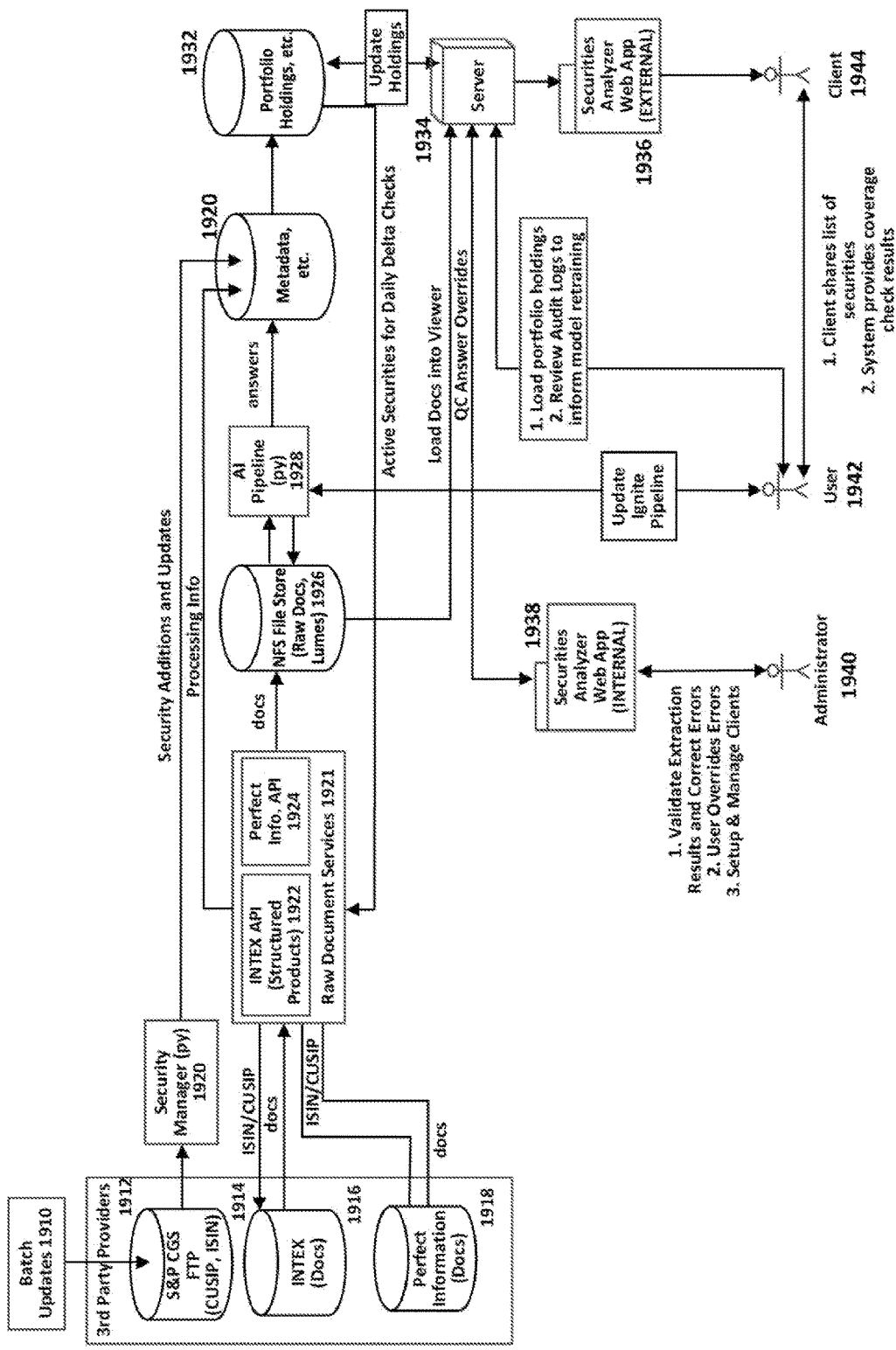
FIG. 19 is an exemplary system architecture, according to an embodiment of the present invention.

FIG. 19 is an exemplary system architecture, according to an embodiment of the present invention. The system supports various interactions with users including Administrator (internal) 1940, Users 1942 (internal) and Clients 1944 (external). Various users of the system may have user profiles that apply permissions, privileges, restrictions and/or other filters.

Administrator 1940 may represent an internal quality control (QC) user and interact with Securities Analyzer through a web application 1938. QC answer overrides may be submitted to Server 1934. Administrator 1940 may perform various actions including validating extraction results and correcting errors. Administrator 1940 may also override errors and setup and manage clients. This process may support human in the loop functionality.

User 1942 may represent annotators, data science team, product management and engineers. User 1942 may interact with an AI platform pipeline represented by 1928.

Client 1944 may represent asset manager custodians, etc. Client 1944 may interact with Securities Analyzer through an external web application 1936 to view outputs and documents.

For example, Client 1944 may share a list of securities with User 1942. In response, User 1942 may provide coverage check results.

User 1942 may load portfolio holdings to Server 1934 and review audit logs to inform model retraining. In this example, Server 1934 may represent a web/app server. Server 1934 may communicate update holdings to App Database 1932 that represents a relational database management system, such as App Postgres.

Third Party Providers 1912 may include various source of data including S&P CGS FTP (CUSIP, ISIN) data source 1914, INTEX (Docs) 1916 and Perfect Information (Docs) 1918.

Data source 1914 may represent data from CUSIP Global Services (CGS). CUSIP numbers may be used to identify securities registered to be sold publicly. ISIN represents a code that uniquely identifies a specific security. For example, INTEX (Docs) and Perfect Information (Docs) may include but are not limited to deal prospectus, offering memoranda, indenture, trust agreements, supplements, amendments and amendments & restatements.

Batch Updates may be provided at 1910. This may occur nightly or at other intervals.

Data Source 1914 may communicate with Security Manager 1920 to provide security additions and updates to Pipeline 1930, such as Pipeline Postgres.

Data Source 1916 and Data Source 1918 may communicate documents to Raw Document Services 1921. Raw Document Services 1921 may include interfaces or APIs to access with various data sources, such as Index API 1922 and Perfect Info API 1924. Processing information may be communicated to Pipeline 1930. In addition, documents may be communicated to File Store 1926, such as NFS (Network File System) file store. Documents from File Store 1926 may be loaded into a viewer through Server 1934.

Ignite Pipeline 1927 may communicate answers to Pipeline 1930 which then communicates to App Database 1932. App Database 1932 may communicate active securities for daily (or other periodic) delta checks to Raw Document Services 1921.

Figure 20:
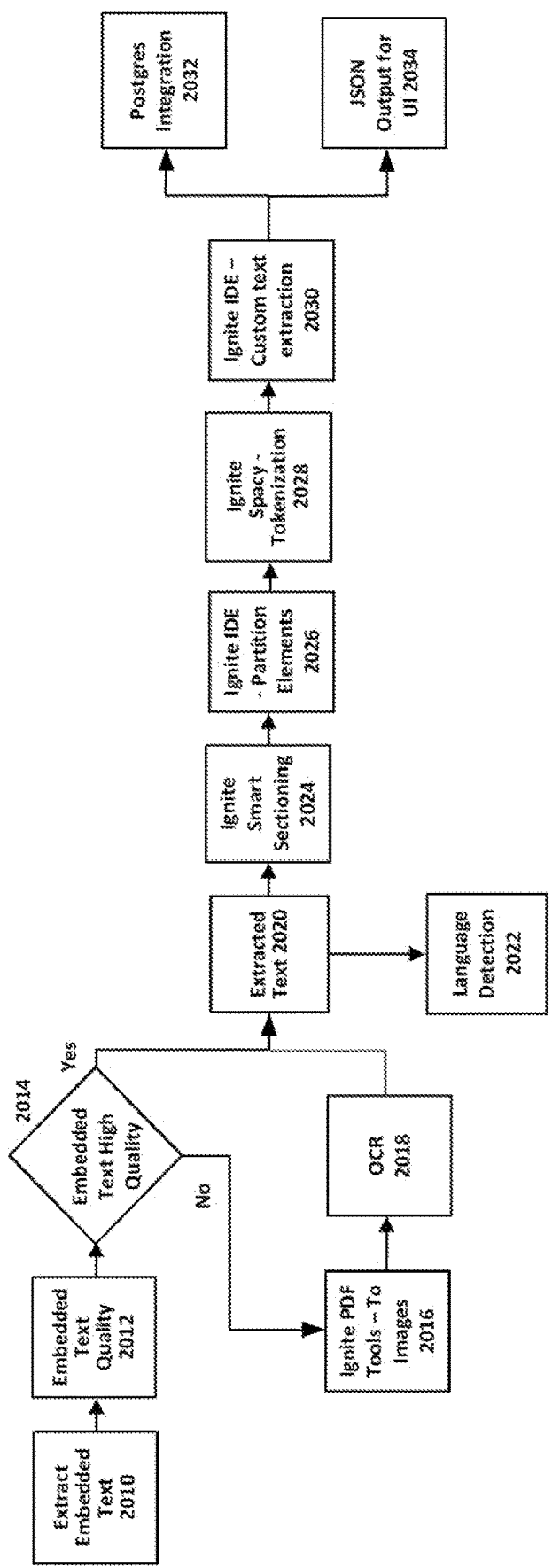
FIG. 20 is an exemplary component architecture, according to an embodiment of the present invention.

FIG. 20 is an exemplary component architecture, according to an embodiment of the present invention. FIG. 20 illustrates interactions between various components including OCR/extraction, natural language processing (NLP) and control. Step 2010 extracts embedded text. Step 2012 determines embedded text quality. Step 2014 determines whether embedded text quality is high. For example, embedded text content from digital documents may be directly extracted from underlying data structure for further processing. If no, Ignite PDF Tools—to Images 2016 may allow for extracting text and metadata from PDF files, adding, inserting and rotating pages, splitting files into multiple documents, copying specific pages and merging or zipping files into one document. Step 2018 applies OCR. Extracted text is identified at step 2020. Language detection may be applied at 2022.

Step 2024 may apply smart sectioning. For example, an embodiment of the present invention may process the extracted text and identify natural sections, breaks, and/or other structuring information to break the document into semantic groups. In addition, IDE may create further domain and use-cases specific partitioning elements to identify groups of relevant content. Robust open-source NLP tooling may identify words, sentences, and other linguistic units to support custom information extraction with the IDE. Step 2026 identifies partition elements. Step 2028 applies tokenization. Step 2030 applies custom text extraction. Based on the extraction, postgres integration may be applied at 2032. JSON output may be communicated via UI at 2034.

Figure 21:
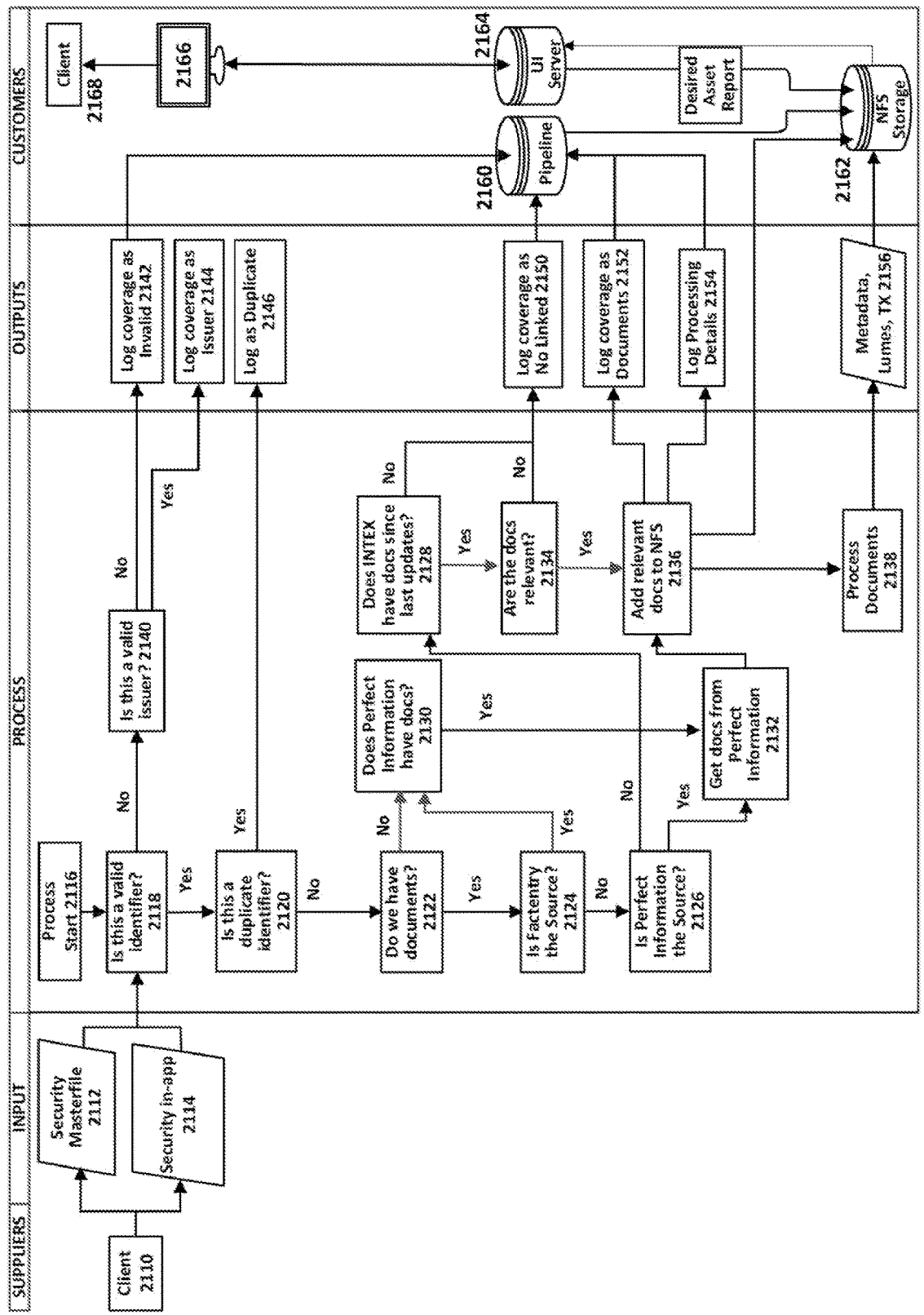
FIG. 21 is an exemplary flowchart for a security coverage check process, according to an embodiment of the present invention.

FIG. 21 is an exemplary flowchart for a security coverage check process, according to an embodiment of the present invention. For example, the security coverage check process may involve providing a list of securities identifiers; checking for data and documents and confirming an analyzable universe.

Client 2110 may provide an input represented by Security Masterfile 2112 or Security in-app 2114. Process may initiate at 2116 and determine whether the input is a valid identifier at 2118. This may involve checking for presence in a security master. If yes, the process may determine whether this is a duplicate identifier at 2120 and logged at 2146. If not, the process may identify corresponding documents at 2122. This may be represented by a document flag in database, such as Postgres. The process may then identify a source, at 2124, 2126, 2128 and retrieve documents at 2130, 2132, 2134, 2136 and process documents at 2138. If a source is not identified and documents are not deemed relevant, the coverage may be logged as "No Linked" at 2150. If documents are identified and deemed relevant, coverage may be logged as "Documents" at 2152. Log processing details may be captured at 2154 and metadata details at 2156.

If the identifier is not deemed valid at 2140, coverage may be logged as "Invalid" at 2142. Otherwise, the coverage may be logged as "Issuer" at 2144.

Coverage data may be logged and captured at Pipeline 2160. Data may be stored and managed at NFS Storage 2162. UI Server 2164 may interface with client 2168 via user interface 2166.

Figure 22:
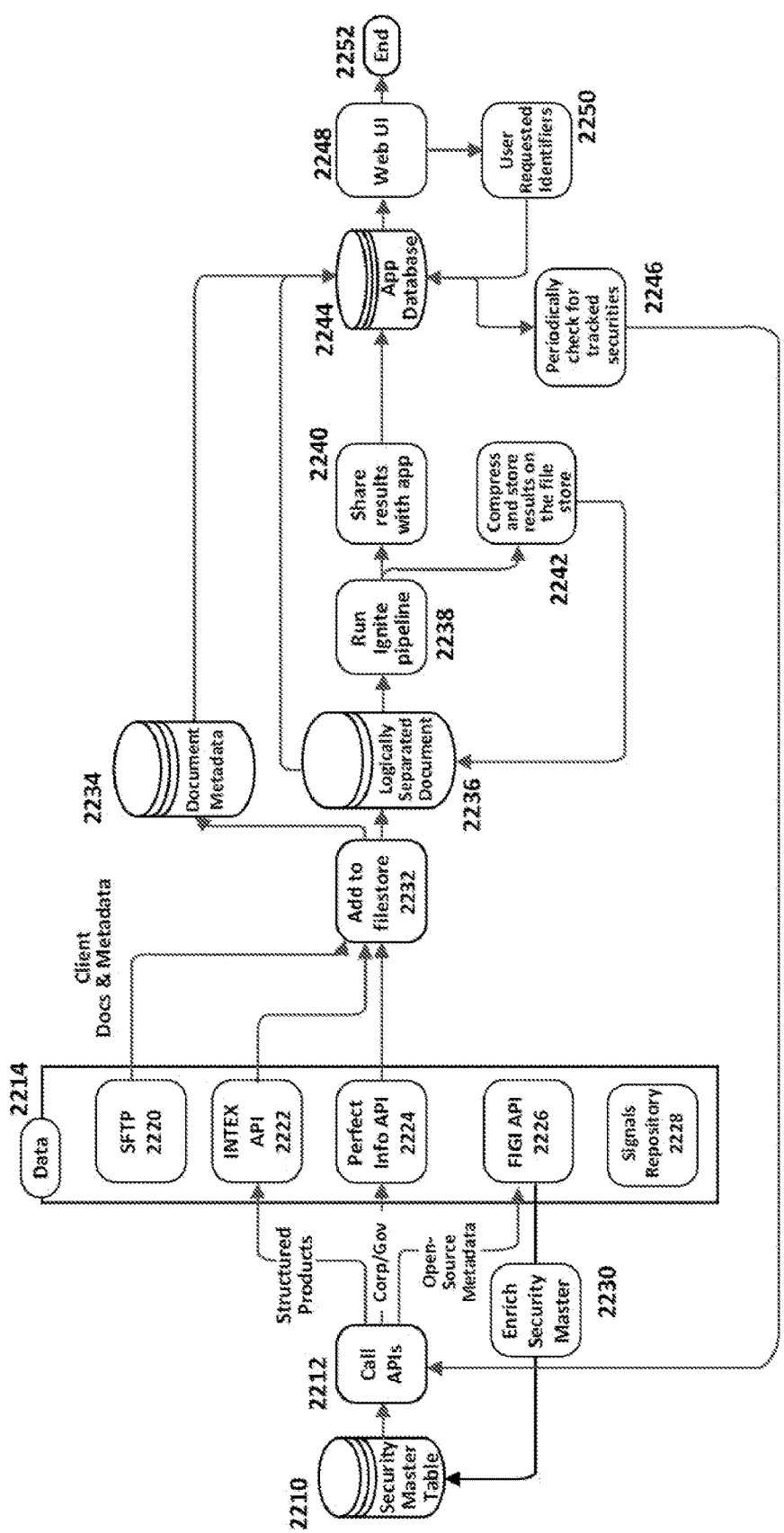
FIG. 22 is an exemplary data flow of a Securities Analyzer, according to an embodiment of the present invention.

FIG. 22 is an exemplary data flow of a Securities Analyzer, according to an embodiment of the present invention. Security Master Table 2210 may store and manage securities data and records. 2212 may call APIs and interact with data sources represented by Data 2214. Data sources may include Secure File Transfer Protocol (SFTP) 2220, Intex API 2222, Perfect Info API 2224, Financial Instrument Global Identifier (FIGI) API 2226 and Signals Repository 2228. API calls may relate to Structured Products, Corporate Governance data and Open-Source Metadata. Data may be used to enrich security master table through 2230. Client documents and metadata may be added to File Store at 2232.

Data may be stored in Document Metadata 2234 and as logically separated documents in 2236. Pipeline may be executed at 2238. Results may be shared at 2240 with App Database 2244. In addition, results may be compressed and stored on a file store through 2242.

App Database 2244 may provide data to a web interface 2248. App Database 2244 may also support periodic checks for tracked securities at 2246 and user requested identifiers at 2250. The process may then end at 2252.

Figure 23:
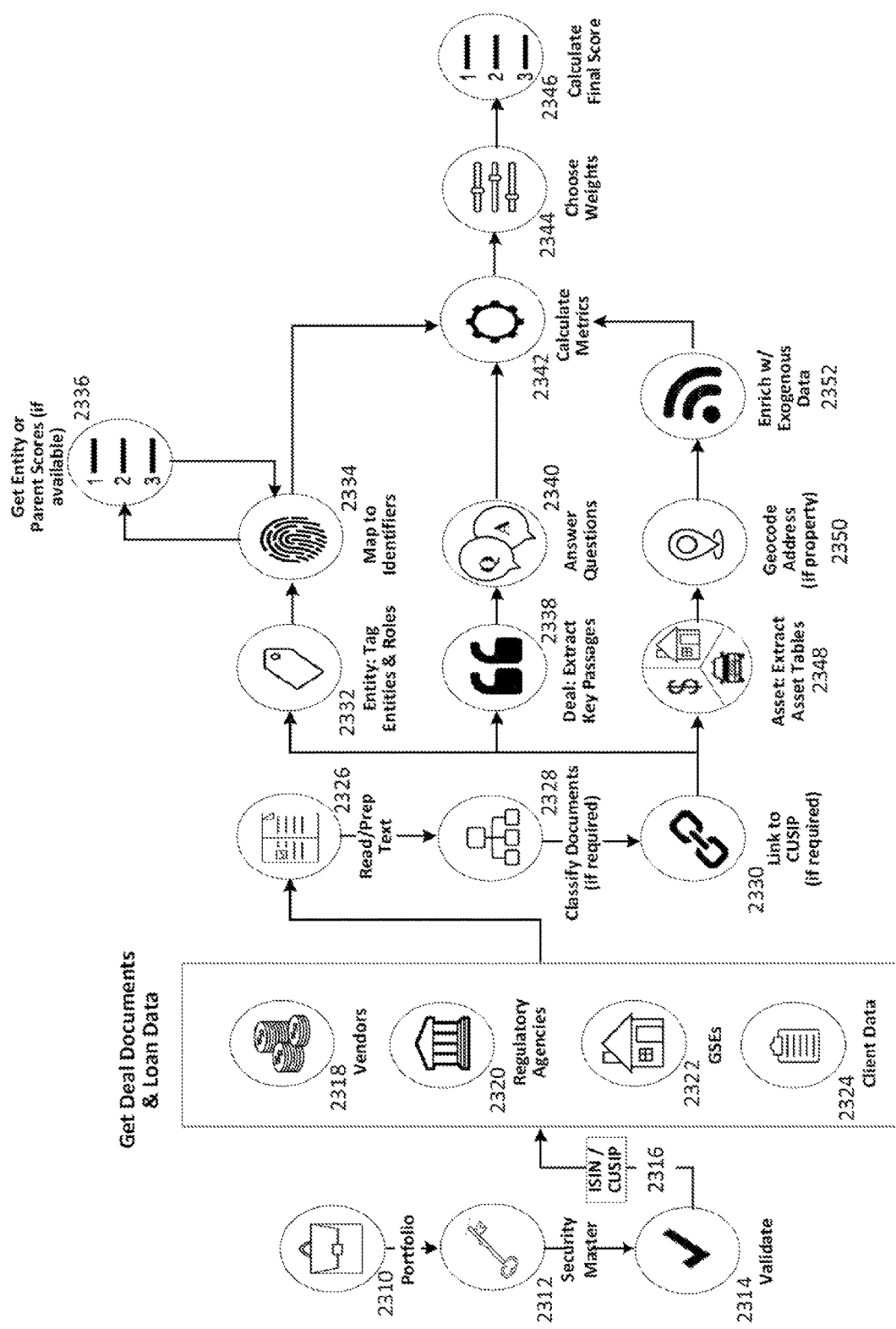
FIG. 23 is an exemplary data flow of a Securities Analyzer, according to an embodiment of the present invention.

FIG. 23 is an exemplary data flow of a Securities Analyzer, according to an embodiment of the present invention. An embodiment of the present invention is directed to a Securities Analyzer for Asset-Backed Securities. An Asset-Backed Security (ABS) represents a type of financial investment that is collateralized by an underlying pool of assets—usually ones that generate a cash flow from debt, such as loans, leases, credit card balances, or receivables. It may take the form of a bond or note, paying income at a fixed rate for a set amount of time, until maturity.

Asset-Backed Securities (ABSs) may include financial securities backed by income-generating assets such as commercial mortgages, home equity loans, student loans, and auto loans. For example, ABSs may be created when a company sells its loans or other debts to an issuer, a financial institution that then packages them into a portfolio to sell to investors. Pooling assets into an ABS is a process called securitization. ABSs appeal to income-oriented investors, as they pay a steady stream of interest, like bonds. Mortgage-backed securities and collateralized debt obligations can be considered types of ABS.

As discussed above, the LIBOR solution is an exemplary set of governance questions under the broader environmental social governance (ESG) umbrella.

An embodiment of the present invention may be applied to analyze asset-backed securities broadly as well as Commercial Mortgage Backed Securities more specifically. An embodiment of the present invention may be applied to various asset-backed securities including automobiles, etc.

As detailed above, LIBOR analysis may be directed to analyzing deal constructs, e.g., document sourcing, ingestion, processing, and answering questions. Those areas are highlighted in FIG. 23 as represented by 2310 to 2326 and 2338 to 2342.

As shown in FIG. 23, portfolio represented by 2310 and security master represented at 2312 may be validated at 2314. ISIN/CUSIP data may be provided at 2316.

Deal documents and loan data may be retrieved. This may be represented by various data sources such as Vendors 2318, Regulatory Agencies 2320, GSEs 2322 and Client Data 2324. This data may be read and prepped at 2326. Documents may be classified at 2328. If applicable, a link to CUSIP may be provided at 2330.

Also shown in FIG. 23 is how the ESG analytics may be supported and integrated. This may include document classification, document linking, entity tagging and linking, and asset-level (e.g., building, auto, home, etc.) analysis.

As shown in FIG. 23, the three exemplary levels may get blended and weighted to determine a deal-level score. For example, entity may involve tagging entities and roles at 2332. This may then be mapped to identifiers at 2334. If available, entity or parent scores may be retrieved at 2336. For deals, key passages may be extracted at 2338 and answers to questions may be generated at 2340. For assets, asset tables may be extracted at 2348. If the asset is a property, address may be geocoded at 2350. Data may be enriched at 2352. Metrics may then be calculated 2342. Weights may be selected at 2344 and then a score may be calculated at 2346.

Given the unique complexities of asset-backed securities, ESG analysis may be applied at various levels, including entity, deal construct and asset.

Entity analysis is the backbone of traditional ESG data analytics and may be considered central to various data offerings in the market. While entity analysis works well with traditional corporate entities, the unique structure of an ABS deal, e.g., as a special purpose vehicle, with no board or formal management and reporting structure may require an alternative approach. Entities in an ABS deal have influence over the origination, servicing, and general governance of the deal and should therefore be included in the analysis either directly or through the inheritance of a score through a parent entity.

With Deal Construct, documentation review is a fundamental part of the ESG process in order to understand governance risks embedded in the deal.

For asset-backed securities that are secured by physical assets, e.g., commercial properties, residential homes, automobiles, etc., analysis may account for the ESG profile of the underlying physical assets linked to the loans. Each asset class may require a different approach to analyze. For example, commercial properties involve an understanding of green building principles and community impact while automobiles involve an understanding of greenhouse gas emissions and safety ratings.

Figure 24:
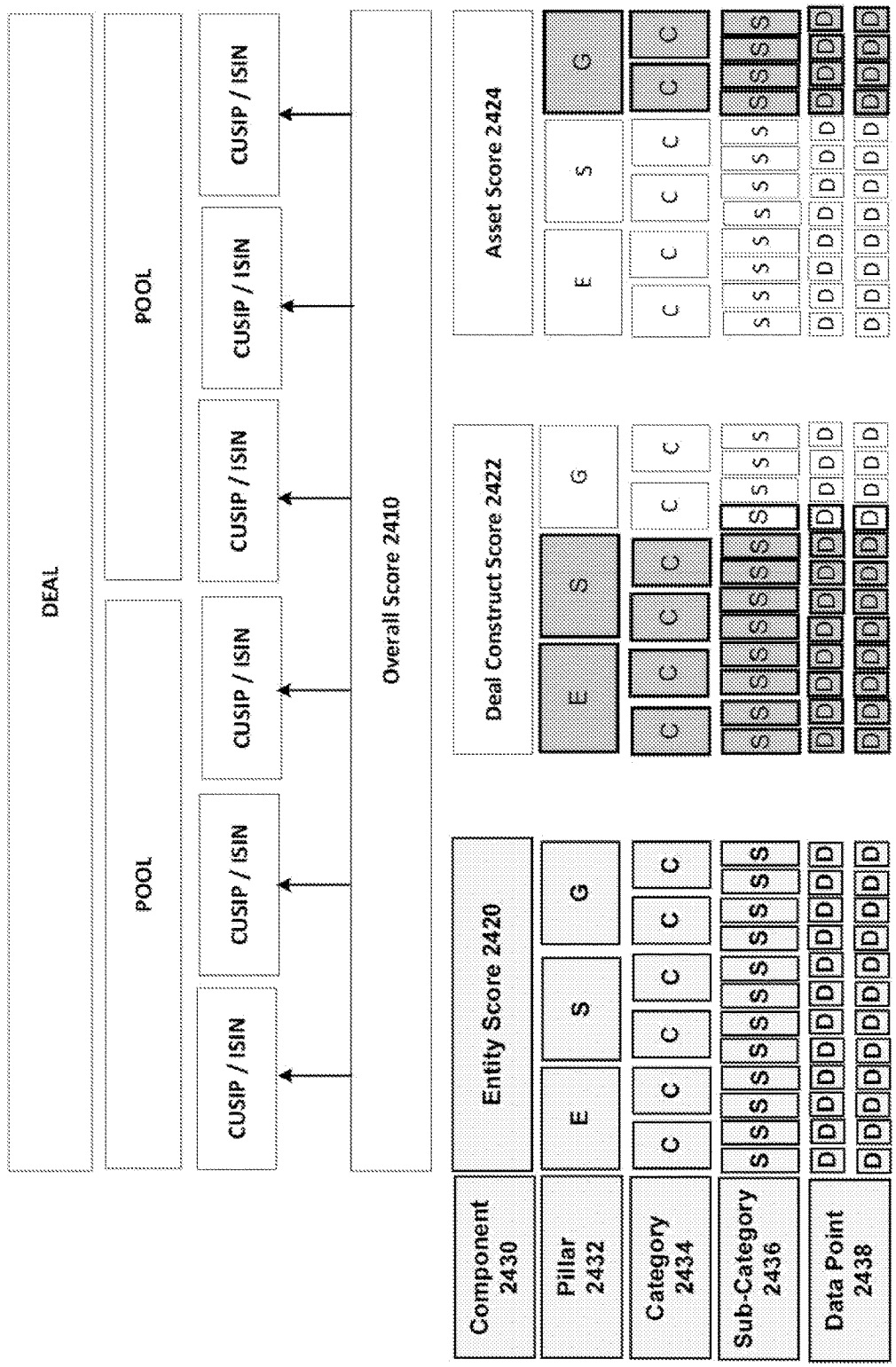
FIG. 24 represents a data-to-deal hierarchy, according to an embodiment of the present invention.

FIG. 24 represents a data-to-deal hierarchy, according to an embodiment of the present invention. A deal may include various components including pools, with corresponding CUSIP/ISIN. An overall score 2410 may be generated based on entity score 2420, deal construct score 2422 and asset score 2424. Each score may be uniquely generated based on components 2430, pillars 2432, categories 2434, sub-categories 2436, data points 2438, etc.

Figure 25:
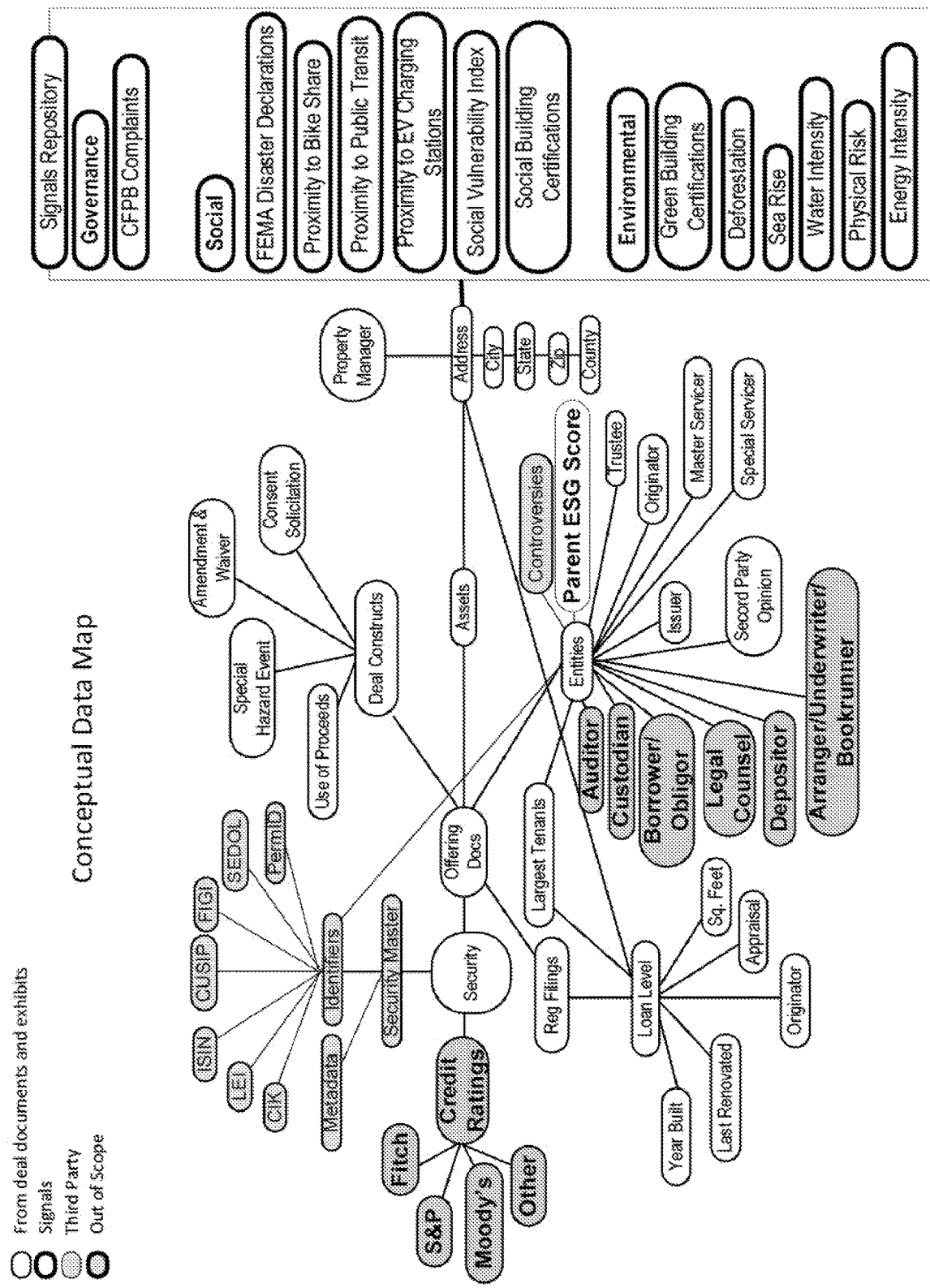
FIG. 25 represents a data map, according to an embodiment of the present invention.

FIG. 25 represents a data map, according to an embodiment of the present invention. The data map may include data from deal documents and exhibits, signals, third party sources. Data may also be identified as being out of scope. Signals repository may include governance (e.g., complaints, etc.); social (e.g. FEMA disaster declarations, proximity to bike share, proximity to public transit, proximity to EV charging stations, social vulnerability index, social building certifications, etc.) and environmental (e.g., green building certifications, deforestation, seas rise, water intensity, physical risk, energy intensity, etc.).

An embodiment of the present invention is directed to extracting key named entities and assigning their role. This may be applied to identify entities for scoring in the event that the metadata is missing or incomplete.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A computer-implemented method for implementing a securities analyzer tool that analyzes structured and unstructured securities data, the method comprising:

Identifying, by a server, one or more data sources of securities documentation;

identifying, by the server, a set of questions;

identifying, by the server, a security instrument and a corresponding set of documents to be analyzed; and applying an artificial intelligence process to the corresponding set of documents, the artificial intelligence process comprising the steps of:

generating, for the at least one input file, a converted file in a data format that is standardized for a plurality of input file types and that includes at least one element; wherein the at least one element is associated with an element identifier and an element type, and is stored in a non-hierarchical relationship format;

generating at least one expression, wherein the expression comprises an expression string in a domain-specific language;

reading, via a machine review portion of the artificial intelligence process, the at least one expression;

applying, via the machine review portion of the artificial intelligence process, the at least one expression to the converted file to automatically generate a response to each of the set of questions; and generating, via an interactive user interface, data relating to the security instrument and the response to each of the set of questions; and applying, by the server, the response to each of the set of questions as feedback to the artificial intelligence process to improve the accuracy of the artificial intelligence process.

2. The method of claim 1, wherein the set of questions relate to one or more of: LIBOR rate reference, permanent successor rate, explicit replacement rate, temporary cessation language and fallback sequence.

3. The method of claim 1, wherein the one or more data sources comprises one or more of: public documents, third party documents and private client documents.

4. The method of claim 1, wherein the at least one expression specifies one or more words, a relationship between the one or more words and at least one pattern that identifies document features.

5. The method of claim 1, wherein the at least one expression represents one or more features to be utilized and one or more patterns of the features to be identified.

6. The method of claim 1, wherein the at least one expression is an input to a n intelligent domain engine (IDE) that leverages natural language processing to systematically classify and analyze a corpus of documents.

7. The method of claim 1, wherein the interactive user interface comprises an interactive portion that displays document support and justification for the response.

8. The method of claim 1, wherein the interactive user interface receives an override input from a user relating to the response.

9. The method of claim 1, wherein the interactive user interface supports amendment generation and downstream processes.

10. The method of claim 1, wherein the interactive user interface comprises a summary view, an asset view and a document view.

11. A system for implementing a securities analyzer tool that analyzes structured and unstructured securities data, the system comprising:

an interface to one or more data sources configured to store and manage securities documentation; and a server configured to:

identify a set of questions;

identify a security instrument and a corresponding set of documents to be analyzed;

apply an artificial intelligence process to the corresponding set of documents, the artificial intelligence process comprising the steps of:

generating, for the at least one input file, a converted file in a data format that is standardized for a plurality of input file types and that includes at least one element; wherein the at least one element is associated with an element identifier and an element type, and is stored in a non-hierarchical relationship format;

generating at least one expression, wherein the expression comprises an expression string in a domain-specific language;

reading, via a machine review portion of the artificial intelligence process, the at least one expression;

applying, via the machine review portion of the artificial intelligence process, the at least one expression to the converted file to automatically generate a response to each of the set of questions; and generating, via an interactive user interface, data relating to the security instrument and the response to each of the set of questions; and applying the response to each of the set of questions as feedback to the artificial intelligence process to improve the accuracy of the artificial intelligence process.

12. The system of claim 11, wherein the set of questions relate to one or more of: LIBOR rate reference, permanent successor rate, explicit replacement rate, temporary cessation language and fallback sequence.

13. The system of claim 11, wherein the one or more data sources comprises one or more of: public documents, third party documents and private client documents.

14. The system of claim 11, wherein the at least one expression specifies one or more words, a relationship between the one or more words and at least one pattern that identifies document features.

15. The system of claim 11, wherein the at least one expression represents one or more features to be utilized and one or more patterns of the features to be identified.

16. The system of claim 11, wherein the at least one expression is an input to an intelligent domain engine (IDE) that leverages natural language processing to systematically classify and analyze a corpus of documents.

17. The system of claim 11, wherein the interactive user interface comprises an interactive portion that displays document support and justification for the response.

18. The system of claim 11, wherein the interactive user interface receives an override input from a user relating to the response.

19. The system of claim 11, wherein the interactive user interface supports amendment generation and downstream processes.

20. The system of claim 11, wherein the interactive user interface comprises a summary view, an asset view and a document view.

* * * * *

UNITED STATES PATENT AND TRADEMARK OFFICE
CERTIFICATE OF CORRECTION

| | | |
|---|---|---|
| PATENT NO. | : 11,907,299 B2 | |
| APPLICATION NO. | : 17/449541 | |
| DATED | : February 20, 2024 | |
| INVENTOR(S) | : Joseph Gwozdz et al. | |

It is certified that error appears in the above-identified patent and that said Letters Patent is hereby corrected as shown below:

In the Claims

In Claim 6, Column 28, Line 35, "expression is an input to a n intelligent domain engine (IDE)" should read --expression is an input to an intelligent domain engine (IDE)--.

Signed and Sealed this
Twenty-sixth Day of March, 2024

Katherine Kelly Vidal
Director of the United States Patent and Trademark Office